United States Patent
Niiori et al.

(10) Patent No.: US 6,442,015 B1
(45) Date of Patent: Aug. 27, 2002

(54) ELECTROCHEMICAL CAPACITORS

(75) Inventors: Yusuke Niiori, Inuyama; Hiroyuki Katsukawa, Aichi-prefecture; Hitoshi Yoshida, Okazaki, all of (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/473,416

(22) Filed: Dec. 29, 1999

(30) Foreign Application Priority Data

| Jan. 7, 1999 | (JP) | 11-002299 |
| Jan. 7, 1999 | (JP) | 11-002300 |
| Mar. 18, 1999 | (JP) | 11-074534 |
| Oct. 15, 1999 | (JP) | 11-293634 |
| Oct. 15, 1999 | (JP) | 11-293635 |
| Nov. 26, 1999 | (JP) | 11-335543 |

(51) Int. Cl.$^7$ .............. H01G 9/00; H01G 9/02
(52) U.S. Cl. .......... 361/502; 361/503; 361/512
(58) Field of Search .............. 361/502–504, 361/508–510, 512; 423/445 R, 448; 428/367, 408

(56) References Cited

U.S. PATENT DOCUMENTS 4,803,597 A * 2/1989 Watanabe et al. ........ 361/502
5,859,761 A * 1/1999 Aoki et al. ............ 361/502
5,953,204 A * 9/1999 Suhara et al. .......... 361/502

FOREIGN PATENT DOCUMENTS

| JP | 9-275042 | 10/1997 |
| JP | 9-320906 | 12/1997 |
| JP | 11-317333 | * 11/1999 |

OTHER PUBLICATIONS

U.S. Copending Application Ser. No. 09/649,545, filing date Aug. 28, 2000, Yusuke Niiori et al.
U.S. Copending Application Ser. No. 09/387,995, filing date Sep. 1, 1999, Yusuke Niiori et al.
U.S. Copending Application Ser. No. 10/068,484, filing date Feb. 5, 2002, Yusuke Niiori et al.

* cited by examiner

Primary Examiner—Dean A. Reichard
Assistant Examiner—Eric W. Thomas
(74) Attorney, Agent, or Firm—Burr & Brown

(57) ABSTRACT

An electrochemical capacitor wherein electrode members include polarizing electrodes, whose main ingredient is a carbon material having partially oxidized graphite-like microcrystalline carbon, separators, and collectors is immersed in a organic electrolytic solution, the polarizing electrodes expanding on charging and contracting on discharging. Ions with ionic radii of 0.33 nm or less are used as the electrolyte cations of the organic electrolytic solution. The cell container holding electrode members and the electrolytic solution is provided with stress relaxing structure. Either collectors or separators are elastomers. The separators are sponge-like porous insulator with continuous pores.

15 Claims, 20 Drawing Sheets

Fig. 15 - Prior Art
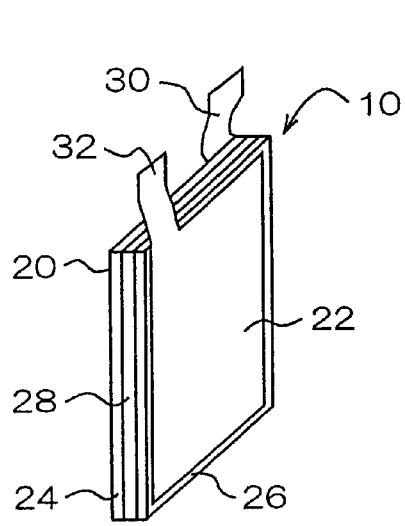
Fig. 16 - Prior Art
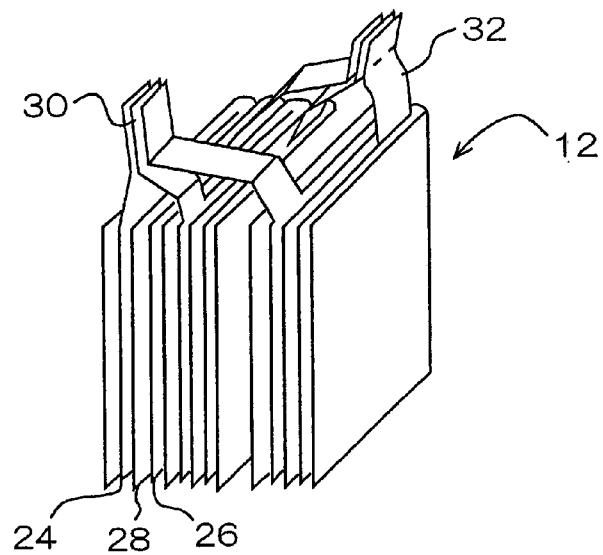
Fig. 17 - Prior Art
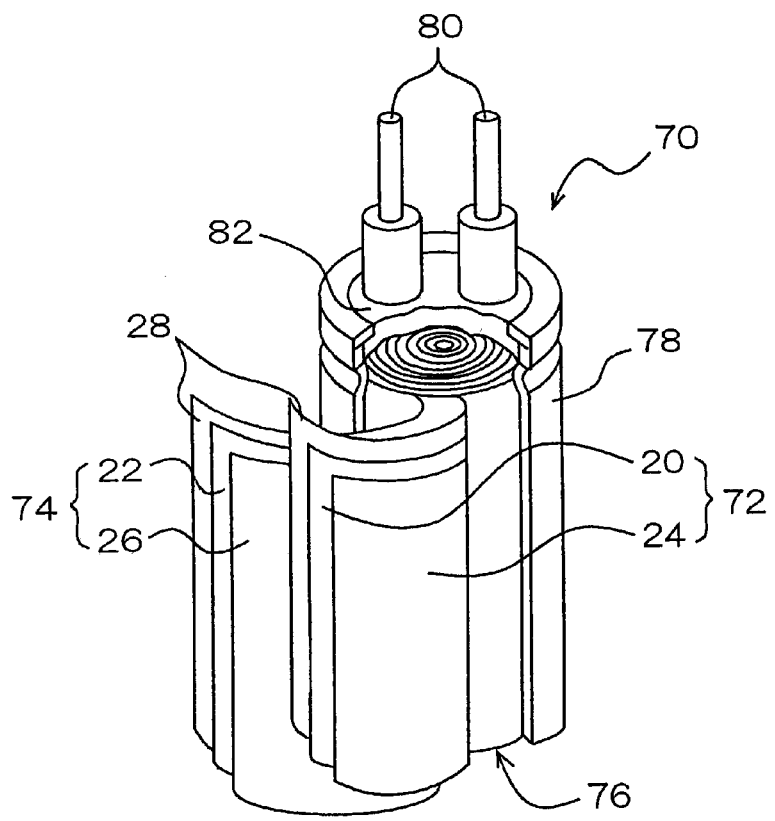

Fig. 18 - Prior Art
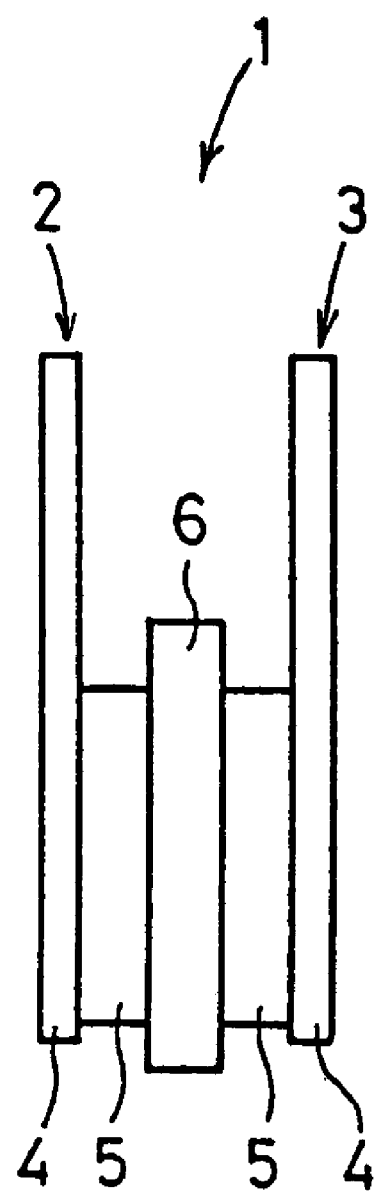

ELECTROCHEMICAL CAPACITORS

BACKGROUND OF THE INVENTION AND RELATED ART STATEMENT

The present invention relates to electrochemical capacitors wherein reliability and durability are improved by reducing the pressure generated by change in volume accompanying charging and discharging, when high-performance carbon materials with large electrostatic capacity are used as polarizing electrodes. The present invention also relates to electrostatic capacitors having structures relaxing the stress generated by expansion of the polarizing electrodes on charging.

Besides being used as back-up power sources and batteries for transportation vehicles from automobiles down, as they have large capacity of the Farad class and are excellent in charging and discharging cycle characteristics, electric double layer capacitors, a type of capacitors, are investigated for use in off-peak power storage from the viewpoint of effective utilization of energy.

A single electrode cell 10, one of the basic structures of such electric double layer capacitors, has the structure as. shown in FIG. 15 in which a positive side polarizing electrode 24 and a negative side polarizing electrode 26 are respectively formed on collectors 20 and 22 generally comprised of metallic materials, said polarizing electrodes 24 and 26 being separated by a separator 28, and are impregnated with electrolytic solution comprising the solvent and electrolytes.

FIG. 16 shows the structure of a single capacitor cell 12, wherein plurality of single electrode cells 10 are electrically connected parallel with each other to electrode outlet parts 30 and 32 formed on collectors 20 and 22. Such a single capacitor cell 12 is suitably used as an electric double layer capacitor with relatively large capacity used for automobiles, etc. Both single electrode cells 10 or single capacitor cells 12 are planar and characterized by ease of tight packing and expansion.

In contrast to such planar electric double layer capacitors, there are also coil type electric double layer capacitors 70 having structures suitable for capacity enlargement similar to a single capacitor cell 12 as shown in FIG. 17. A coil type electric double layer capacitor 70 is prepared using a coil 76 prepared by cylindrically coiling a positive electrode sheet 72, in which a positive electrode side polarizing electrode 24 is formed on a collector 20, and a negative electrode sheet 74, in which a negative pole side polarizing electrode 26 is formed on a collector 22, with a separator 28 between them, and for example by putting said coil 76 in a case 78 and filling the case with electrolytic solution, and sealing the opening end surface of the case 78 with a sealing plate 82 having an electrode terminal 80 formed on it, while securing continuity between electrode sheets 72 and 74 and each electrode terminal 80.

As polarizing electrode materials for such electric double layer capacitors, those having activated carbon with relative surface area of 1000 $m^2$ or more as a main ingredient have traditionally been used. The construction of a pair of electrodes of an electric double layer capacitor using such activated carbons will be explained referring to FIG. 18.

As shown in FIG. 18, this pair of electrodes 1 is constructed to have a positive pole 2 and a negative pole 3 stuck to one another with a separator 6 between them.

To explain more precisely about the positive pole 2 and the negative pole 3, they have layers of polarizing electrodes 5 containing activated carbon as an essential ingredient and optionally binders such as polytetrafluoroethylene and conduction aids such as carbon black, on the surface of a collector 4 comprising aluminum foil, etc.

Further, the layer of polarizing electrode 5 is formed for example by blending a mixture of fixed ratio of activated carbon, a binder and a conduction aid to give a sheet of fixed shape and area, which is then adhered onto a collector 4. It may also be formed by coating the surface of a collector 4 with a paste of a mixture of activated carbon, a binder, a conduction aid, and a solvent and drying it to remove the solvent by evaporation. Known coating methods such as spray coating and brush coating may be adopted.

Here the separator 6 is impregnated with an organic electrolytic solution (not shown) such as ethylene carbonate, propylene carbonate, γ-butyrolactone, and sulfolane, containing a fixed concentration, for example, of 1 mol/l of an electrolyte such as $Et_4NBF_4$ ($Et_4N$; tetraethylammonium), $Et_4NPF_6$, $Bu_4NBF_4$ ($Bu_4N$: tetrabutylammonium) or $Bu_4NPF_6$.

When such an electric double layer capacitor having a pair of electrodes 1 and a separator 6 is charged, the ions of the electrolyte are adsorbed inside micropores of the activated carbon which is the essential ingredient of the polarizing electrode, and this adsorption causes capacitance to occur in the electric double layer capacitor.

As the separator 6, materials may be used that electrically insulate the positive pole 2 and the negative pole 3 to prevent them to short, and may allow ions of the electrolytes to penetrate so that ions of the electrolytes can migrate toward the positive pole and the negative pole 3 during charging and discharging. Cellulose blend paper is particularly suitable. Cellulose blend paper also has advantages that it is inexpensive, enabling cost reduction, and may be formed thinner, enabling reduction of internal resistance of the electric double layer capacitor.

Further, cellulose blend paper will not melt even when the positive and negative electrodes short, as it has a high melting point. Therefore, it is seldom used for electric cell separators. This is because migration of electrolyte ions is not prevented, as ion penetrating pores of the separator are not blocked even when the internal temperature of an electric cell rises due to excessive reaction of the cell when electrodes short, resulting in further increase of the internal temperature.

Internal temperature of an electric double layer capacitor, however, scarcely rises even when the separator does not melt in a short circuit. In other words, there is no problem in using high melting point separators, since internal temperature would not rise significantly in a short circuit. These and the advantages described above are the reason why cellulose blend paper is widely used.

Capacitance and upper limited voltage of conventional electric double layer capacitors described above depend on the activation method of activated carbon. For example, capacitance is 15 F/cc and upper limited voltage is 3 V for an electrochemical capacitor using steam activated carbons, and capacitance is 20 F/cc and upper limited voltage is 2.5 V for an electrochemical capacitor using alkali-activated carbons.

Capacitance and upper limited voltage of various capacitors including electrical double layer capacitors are expected recently to improve further, those with these values above 30 F/cc and 3.5 V being desired.

Thus, alkali-activated new polarizing electrode materials are reported in Japanese patent provisional publications No.

275042/1997 and 320906/1997 in order to increase the capacity of polarizing electrode materials.

In the case of electrochemical capacitors using alkali-activated polarizing electrode materials as disclosed in Japanese patent provisional publications No. 275042/1997 and 320906/1997, however, there is a problem of volume expansion of the polarizing electrode materials due to charging. There was no such problems of volume expansion in electric double layer capacitors using conventional activated carbons.

This volume expansion tends to increase as the amount of electricity contributing to charging and discharging increases, and is especially a big problem in uses wherein it is preferable that capacitance is big, charging and discharging capacity is big, and further capacitance density (density of capacitance for unit volume) or capacitance weight-density (density of capacitance for unit weight) is big, especially as in automobiles.

For example, in electrochemical capacitors using single capacitor cells 12 described above, single capacitor cells 12 are tightly packed in a capacitor case (to be called "case" hereafter) with least opening in order to make the capacitance density as large as possible. Here electrode outlets 30, 32 are formed in the direction perpendicular to the direction of stacking of single electrode cells 10 -constructing single capacitor cells 12, separators 28 are designed to have areas larger than those of polarizing electrodes 24, 26, and the polarizing electrodes 24, 26 expand little in the direction perpendicular to the direction of stacking. Therefore polarizing electrodes 24, 26 do not hardly touch the internal walls of the case directly, so that they are not susceptible to volume expansion described above.

In the direction of stacking of single electrode cells 10 in single capacitor cells 12, however, the surface pressure from volume expansion of polarizing electrodes 24, 26 of each single electrode cell 10 sums up to a significant amount of pressure, possibly causing deformation or destruction of the case and damage or deterioration of collectors 20, 22 and separators 28, eventually even inducing deterioration of the cycle characteristics. Though it is possible here to deal with the surface pressure by employing stronger or thicker materials for the case, this may cause reduction of capacitance density or weight density of capacitance.

On the other hand, when holding pressure between internal walls of the case and single capacitor cells is reduced to lessen the surface pressure due to such volume expansion, the single capacitor cells 12 may not be held stably in the case, causing problems of increased internal resistance and greater deviation of capacitance, that would reduce stability of properties. Such problems would be especially greater under circumstances where there is constant vibration as in the case of being installed in automobiles.

As coil-type electric double layer capacitors 70 can be considered to have structures wherein polarizing electrodes are stacked in the direction of the core, the problem of volume expansion of polarizing electrodes in the electrochemical capacitors having a coil-type structure may be considered in the same manner as in the case of single capacitor cells 12. Thus, in coil-type electrochemical capacitors, surface pressure is applied onto the cylindrical wall of the case, that would cause deformation or destruction of the case with greater possibility.

The present invention was made in view of the problems of conventional technology described above, with the purpose of providing electrochemical capacitors in which reduction of surface pressure is enabled without reducing capacitance by paying attention to electrolytes of organic electrolytic solutions used in electrochemical capacitors.

Another purpose of the present invention is to provide electrolytic capacitors showing capacitance and upper limited voltage that are superior to those of electric double layer capacitors using activated carbon.

SUMMARY OF THE INVENTION

Thus, according to the present invention, there is provided an electrochemical capacitor comprising:

polarizing electrodes, whose main ingredient is a carbon material having partially oxidized graphite-like microcrystalline carbon, and an organic electrolytic solution, said polarizing electrodes being immersed in the organic electrolytic solution, and said polarizing electrodes expanding on charging and contracting on discharging, wherein ions with radius of ions of 0.33 nm or less are used as electrolyte cations of said organic electrolytic solution.

In such electrochemical capacitors of the present invention, it is preferable to use trimethylammonium ion or methylethylpyrrolidinium ion as the cation.

Also, according to the present invention, there is provided an electrochemical capacitor comprising:

electrode members comprised of polarizing electrodes, whose main ingredient is a carbon material having partially oxidized graphite-like microcrystalline carbon, separators, and collectors, an organic electrolytic solution, and a cell container containing the electrode members and the organic electrolytic solution, said electrode members being immersed in the organic electrolytic solution, and said polarizing electrodes expanding on charging and contracting on discharging, wherein said electrode members and said cell container are provided with stress relaxing structure.

As stress relaxing structures suitably employed in the electrochemical capacitors of the present invention, there are bellows and flat spring types. Further, it is also preferable to use an elastomer for either the collector or the separator.

According to the present invention, there is further provided an electrochemical capacitor comprising:

electrode members comprised of polarizing electrodes, whose main ingredient is a carbon material having partially oxidized graphite-like microcrystalline carbon, separators, and collectors, and an organic electrolytic solution, said electrode members being immersed in the organic electrolytic solution, and said polarizing electrodes expanding on charging and contracting on discharging, wherein at least either said collectors or said separators is an elastomer.

It is preferable to use elastically deformable porous conductive rubber sheets or porous aluminum sheets as collectors for electrochemical capacitors according to the present invention.

In the electrochemical capacitor described above, it is preferable to use an elastically deformable insulating porous body as the separator, and one formed of porous rubber, porous cloth or nonwoven fabric of glass fiber, and cellulose nonwoven fabric as the insulating porous body. Also, the electrode structure is preferably in an oppressed condition under the pressure of 2 kgf/cm$^2$ (196 kPa) or more.

Plastic deformation of the cell containers will not occur in these electrochemical capacitors of the present invention, as generated stress is relaxed by the cell containers or the electrode structures.

According to the present invention, there is still further provided an electrochemical capacitor comprising:

polarizing electrodes, whose main ingredient is a carbon material having partially oxidized graphite-like microcrystalline carbon, separators, and an organic electrolytic solution, said polarizing electrodes and said separators being immersed in the organic electrolytic solution, and said polarizing electrodes expanding on charging and contracting on discharging, wherein said separators are sponge-like porous insulators with continuous pores.

In such electrochemical capacitors, cloth or nonwoven fabric having at least inorganic fibers is preferably used as the porous insulators. It is also preferable to use polymeric materials as the porous insulators.

The electrochemical capacitors will not run short of organic electrolytic solution by using, as the separators, sponge-like materials that can be impregnated with large amounts of organic electrolytic solution. Further, as these separators are easily deformable, polarizing electrodes will not go through the separators even when expanded. Thus, the positive and negative poles may not short.

BRIEF DESCRIPTION OF THE DRAWINGS

FIG. 4 is a cross-sectional view illustrating an embodiment of the electrode structure an electrolytic capacitor of the present invention is provided with.

FIG. 5 is a cross-sectional view illustrating another embodiment of the electrode structure an electrolytic capacitor of the present invention is provided with.

FIG. 6 is a cross-sectional view illustrating still another embodiment of the electrode structure an electrolytic capacitor of the present invention is provided with.

FIGS. 9(A) and 9(B) are perspective views illustrating embodiments of the electrode structures electrolytic capacitors of the present invention are provided with.

FIG. 15 is a perspective view of an embodiment of the structure of a single electrode cell.

FIG. 16 is a perspective view of an embodiment of the structure of a single capacitor cell.

FIG. 17 is a perspective view of an embodiment of the structure of a coil-type capacitor.

FIG. 18 illustrates an embodiment of the electrode pair construction a conventional electrochemical double layer capacitor is provided with.

FIG. 19 illustrates an embodiment of the electrode pair construction the electrochemical double layer capacitor of the present invention is provided with.

DETAILED DESCRIPTION OF PREFERRED EMBODIMENTS

Electrochemical capacitors of the present invention have polarizing electrodes comprising as the main ingredient carbon materials having partially oxidized graphite-like microcrystalline carbon, impregnated with an organic electrolytic solution, said polarizing electrodes being characterized by volume expansion on charging and volume contraction on discharging. First the carbon materials will be explained below.

Organic materials such as petroleum cokes, coal cokes, petroleum pitch (tar), coal pitch (tar), phenolic resins, meso phase carbon, polyvinyl chloride, polyvinylidene chloride, polyimide, palm shell, and saw dust are first thermally treated in an inert environment, around the temperature range of about 700–1000° C. to obtain the carbon material. Either one kind of organic material alone or a mixture of a plurality of organic materials may be used. Nitrogen or rare gases such as argon and helium may be suitably used.

Next, the carbon material obtained above is preferably ground to have fixed particle size. Grinding is not necessary, here, in cases where the carbon material is obtained in a form of powder, for instance as the organic material is in the form of powder. Uniformity in the partial oxidation reaction and reduction of the time for oxidation may be realized by this grinding. Various known methods of either dry or wet grinding may be used.

Next, carbon materials having graphite-like microcrystalline carbon can be obtained by partial oxidation of the powdery carbon materials obtained above. As the methods of partial oxidation, here, besides heat treatment with oxidative gases such as air and oxygen, and chemical oxidation methods using for example hot nitric acid, oxidation methods by thermally treating the organic materials in the presence of at least one kind of alkali metal compound (to be called "alkali metals" hereafter) containing alkali metal and oxygen atoms below carbonation temperature of the organic materials in an inert gas atmosphere can be used.

Potassium, sodium, and lithium are suitably used as the alkali metal elements, and hydroxides such as potassium hydroxide and sodium hydroxide and carbonates such as potassium carbonate and sodium carbonate are suitably used as the oxygen-containing compounds of alkali metals. These alkali metals and their compounds may be used as mixtures of two or more kinds. Carbonized materials are thermally treated together with at least one alkali metal or alkali metal compound below decomposition temperature of organic materials in an inert gas atmosphere, and then washed with alcoholic solvents such as methanol and ethanol or distilled water, and filtered to obtain the carbon materials used for polarizing electrodes.

Figure 13A:
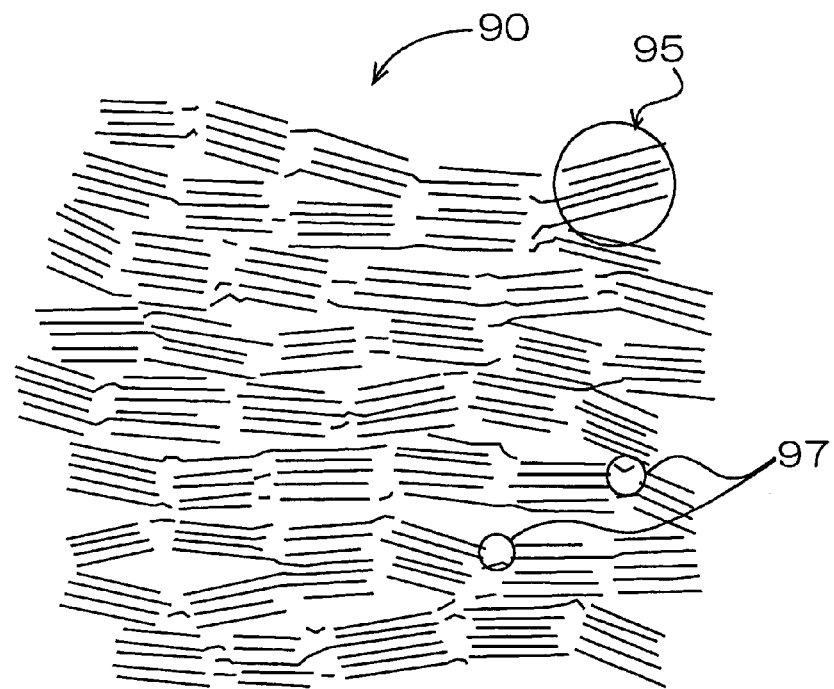
FIGS. 13 (A), (B) schematically illustrate microstructures of carbon materials preferably utilized in electrochemical capacitors of the present invention.

Next, "partially oxidized graphite-like microcrystalline carbon" will be explained together with the structure of carbon materials. When various organic raw materials are carbonized at 1000° C. or less, carbon of random layer structure 90 or 91 having surfaces with incomplete six membered ring network as generally shown in FIG. 13(A), (B). "Graphite-like microcrystalline carbon" denotes regularly layered microcrystalline carbon 95 of 0.1 nm—tens nm among this carbon of random layered structure 90 and 91.

Carbon of random layered structure 90 of FIG. 13(A) has a structure wherein carbon microcrystals 95 are stacked at irregular angles with each other, with their layer planes oriented nearly parallel but not completely parallel. Such carbon of random layered structure 90 is found often in organic materials easily converted to graphite during the carbonization process.

Figure 13B:
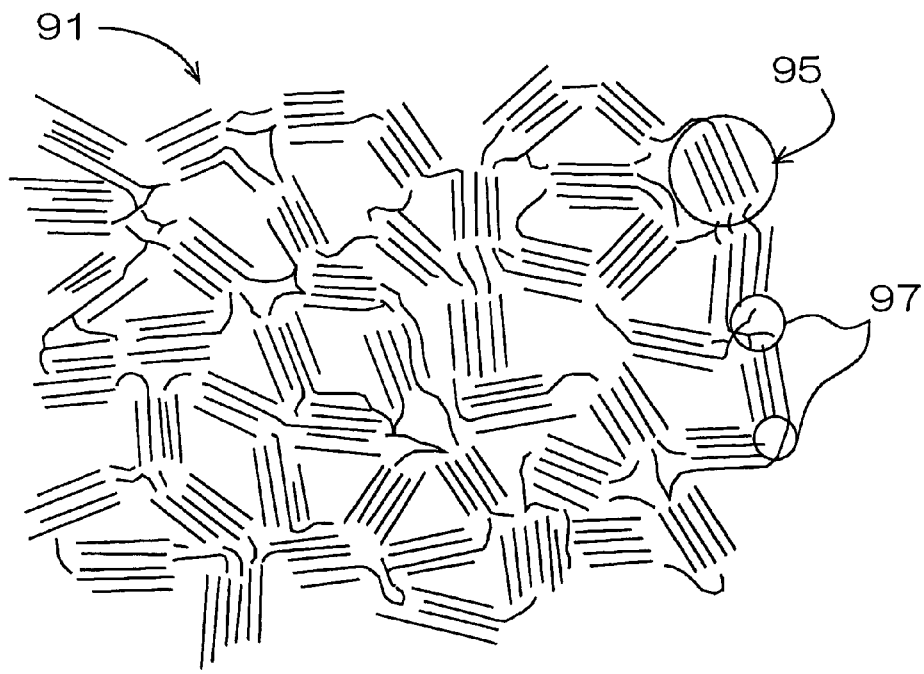

On the other hand, carbon of random layered structure 91 of FIG. 13(B) has a structure wherein carbon microcrystals 95 are randomly oriented in network forms, often found in organic materials difficultly turned to graphite during the carbonization process.

When these carbons of random layered structure 90, 91 are oxidized, for example, in the air, the parts 97 with less regularity as crystals are first oxidized and evaporated as carbon monoxide and dioxide. As oxidation advances, edges of carbon microcrystals 95 themselves and parts with incomplete six member ring structure are oxidized, and finally all the carbon is oxidized into gases.

Figure 14:
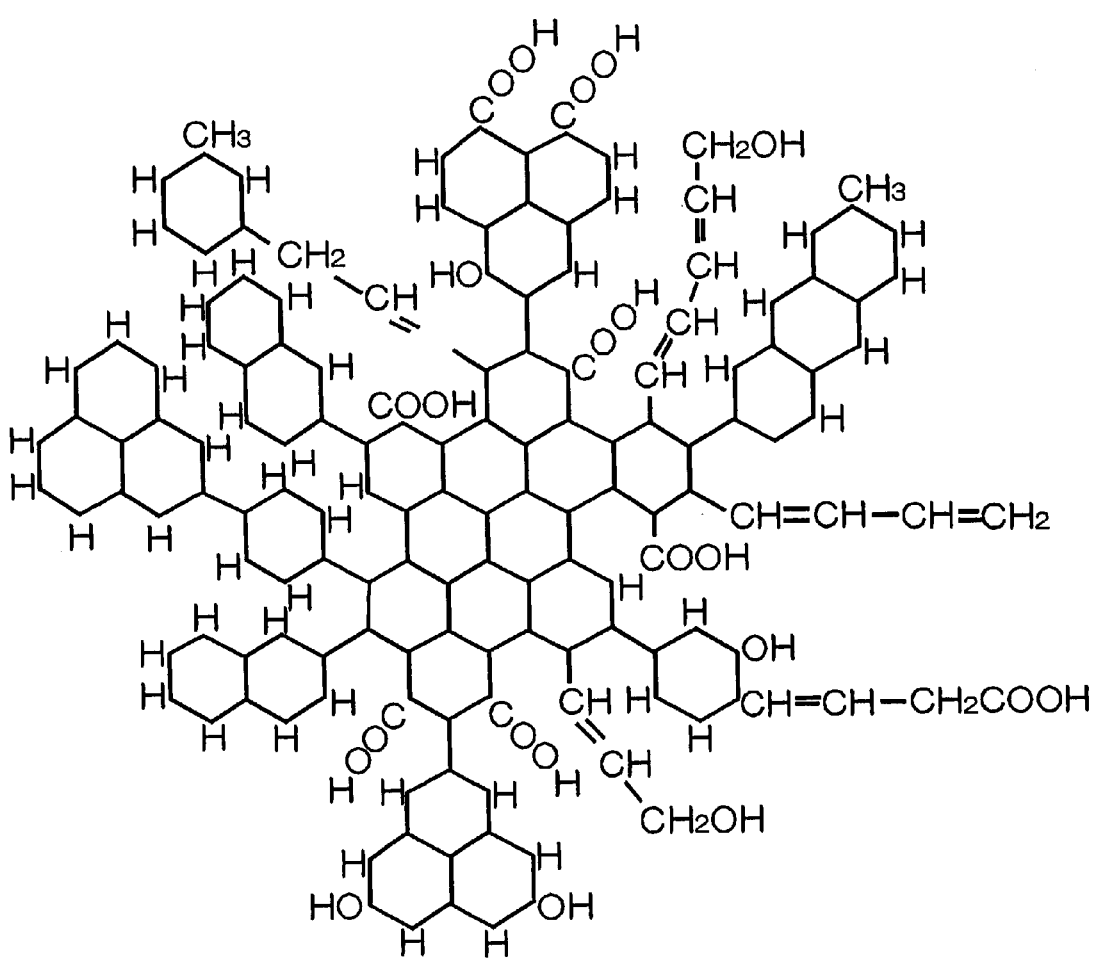
FIG. 14 schematically illustrates the molecular structure of microcrystalline carbon in the carbon material preferably used in the electrochemical capacitor of the present invention.

By controlling the oxidation condition, however, partial oxidation can be realized, resulting in "partially oxidized graphite-like microcrystalline carbon." In this carbon material, mainly acidic functional groups are bound to edges and regions with imperfect structure of six membered ring networks of the microcrystals, as shown in FIG. 14. It goes without saying that FIG. 14 schematically illustrates a form of molecular structure of the carbon material, and that it does not mean that the carbon materials of the present invention are limited to those with the structure of FIG. 14.

Polarizing electrodes are now prepared with the carbon materials described above as the main ingredient. Preparation of this polarizing electrode is carried out by adding organic binder and conduction aids such as carbon black to the carbon material, mixing and blending them, and processing the product into various forms such as plates and sheets.

The carbon materials can be used as materials for polarizing electrodes regardless of capacitor structures, and capacitors with various structures are produced, for example, by putting the polarizing electrodes in the cases as single electrode cells 10 shown in FIG. 15, and single capacitor cells 12 shown in FIG. 16, and further as structures such as coil-type capacitors shown in FIG. 17, impregnating them with organic electrolytic solutions.

The electrochemical capacitors related to the first aspect of the present invention will be explained next.

In the first aspect of the present invention, organic electrolytic solutions for these capacitors containing electrolyte cations with ionic radii of 0.33 nm or less are used. In other words, the capacitors of the present invention are those in which solutes comprising ions with positive charges, namely cations, with ionic radii of 0.33 nm or less when the solute is dissolved in the organic electrolytic solution and exist as ions.

This ionic radii was decided using the ionic radius (0.343 nm) of tetraethylammonium, conventionally used as a standard electrolyte, as the standard reference. Thus, in comparison with cases using conventional technology utilizing electrolytes comprising tetraethylammonium, freedom of selection of case materials and design of case thickness is increased, increase in capacitance density and weight density of capacitance are realized, and improvement of reliability and long life are realized, by reducing volume change of the polarizing electrodes accompanying charging and discharging and the pressure due to the volume change. Particularly, embodiments of ions with such ionic radii are trimethylethylammonium ions (ionic radii: 0.319 nm) and methylethylpyrrolidinium (ionic radii: 0.327 nm).

As anions for such cations, tetrafluoroborate ion ($BF_4^-$) and hexafluorophosphate ion ($PF_6^-$) are suitable. Thus, $BF_4$ salts or $PF_6$ salts of trimethylammonium or methylethylpyrrolidinium are suitably used.

As solvents for electrolytic solutions, those containing at least one of propylene carbonate (PC), γ-butyrolactone (GBL), ethylene carbonate (EC), sulfolane (SL) are suitably used. Also, it is possible to use those comprising at least one of said PC, GBL, EC, and SL as main solvents, and those comprising at least one of dimethyl carbonate (DMC), ethylmethyl carbonate (EMC), and diethyl carbonate (DEC) as auxiliary solvents.

Here, the main solvent means a solvent that can serve sufficiently as an electrolytic solvent even alone, and the auxiliary solvent means a solvent that alone may serve poorly as an electrolytic solvent, but its combination with a main solvent can serve better than the main solvent or the auxiliary solvent alone, and there is no limitation in the amount of the auxiliary solvent such as less than 50%.

Next, electrochemical capacitors relating to the second aspect of the present solvent will be explained.

The single cell and the electrode member of an electric double layer capacitor (will be called a "conventional capacitor" below) using conventional activated carbon will be explained first with reference to FIGS. 8–10.

Figure 8:
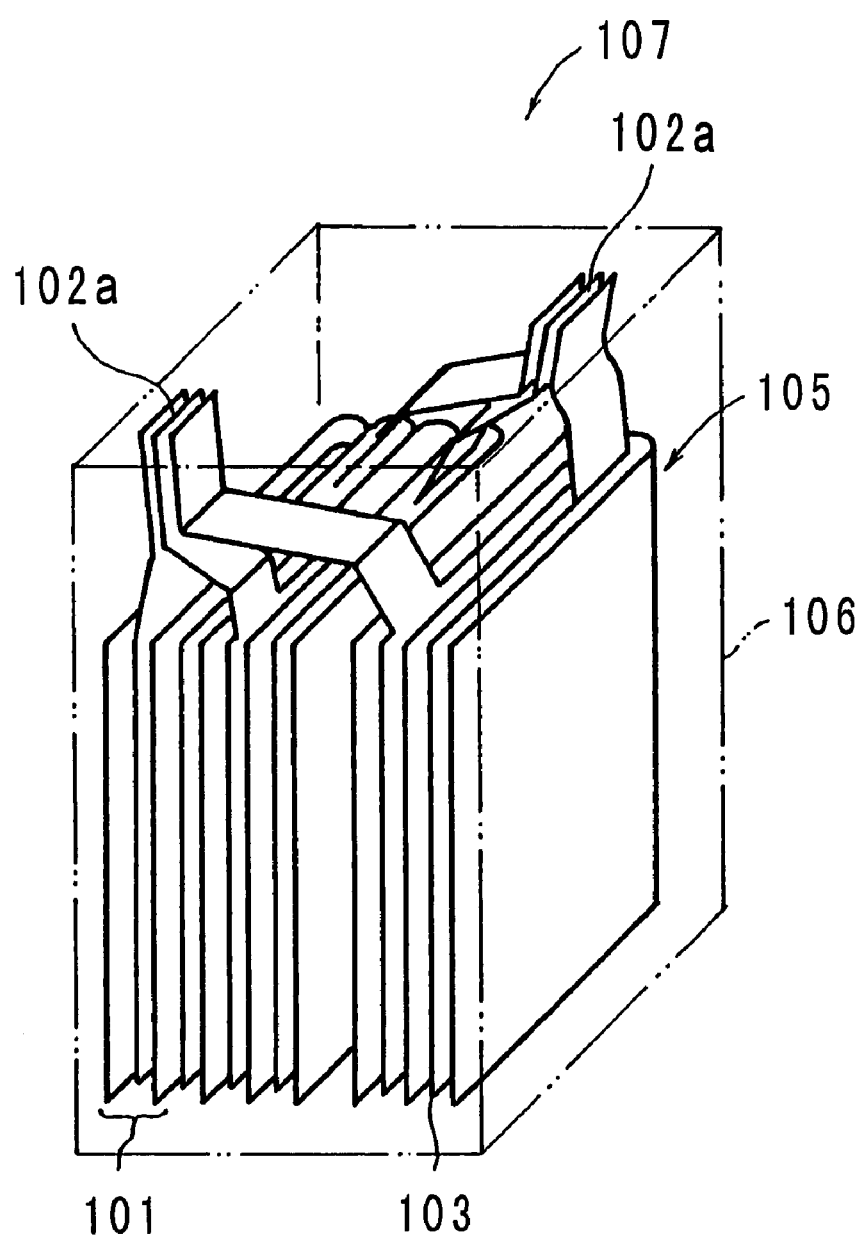
FIG. 8 is a perspective view illustrating an embodiment of the construction of a conventional electrochemical capacitor (unit cell).

A single cell 107 of the conventional capacitor is shown in FIG. 8. This single cell 107, put in a cell container 106, is a stack 105 formed by alternatingly stacking a plurality of electrode members 101, shown in FIG. 9(A), FIG. 9(B), and FIG. 10, that serve as positive and negative poles, and then bundling outlets 102a of each electrode.

An organic electrolytic solution (not shown) of a solute such as $Et_4NBF_4$ ($Et_4N$; tetraethylammonium), $Et_4NPF_6$, $Bu_4NBF_4$ ($Bu_4N$: tetrabutylammonium), or $Bu_4NPF_6$, dissolved at a fixed concentration of for example about 1 mol/l in ethylene carbonate, propylene carbonate, γ-butyrolactone, or sulfolane (SL), is put in a cell container 106, in which the stack 105 is immersed. And a unit cell 107 is constructed by electrically connecting the bundled electrode outlets 102a to the positive terminal (not shown) or the negative terminal (not shown) fixed on top of the cell container 106. The electrode member connected to the positive terminal serves as a positive pole, and the electrode member connected to the negative terminal serves as a negative pole.

Figure 9A:
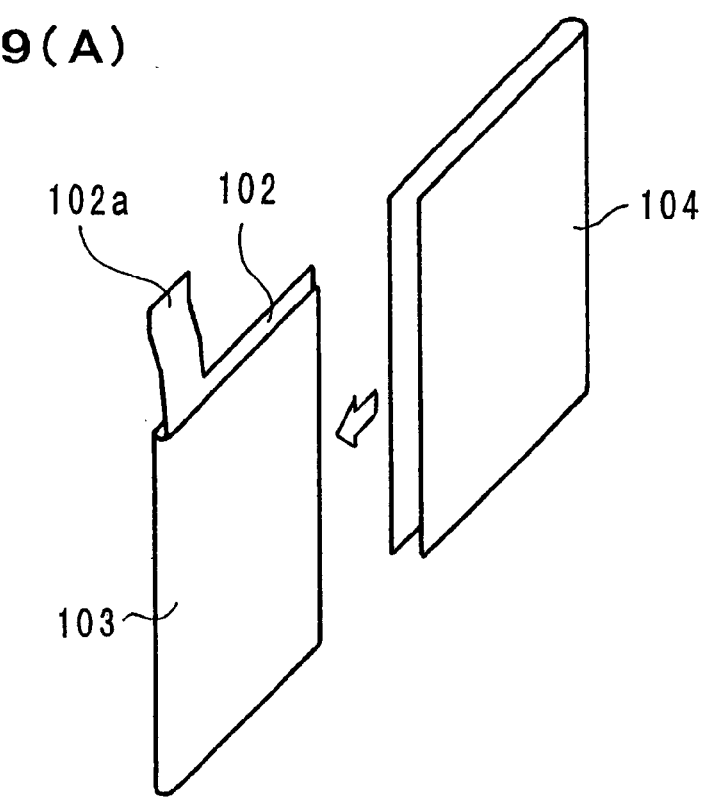
Figure 9B:
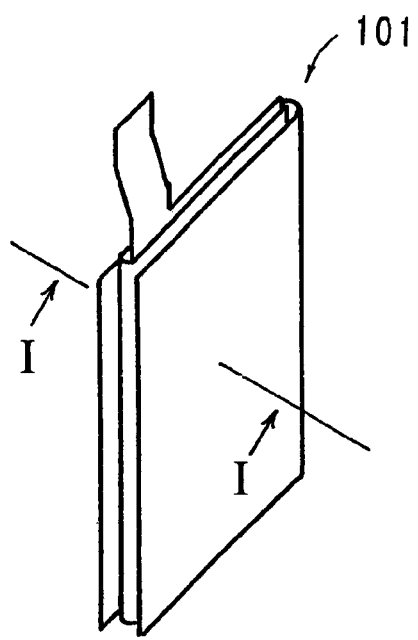

The electrode members 101 are constructed as shown in FIG. 9(A), wherein collectors 102 having electrode outlets 102a are held between sheets of polarizing electrodes 103, and the products are further held between separators 104 as shown in FIG. 9(B). Aluminum foil and a blend paper, processed into determined shapes, may be used as collectors 102 and separators 104 respectively.

Figure 10:
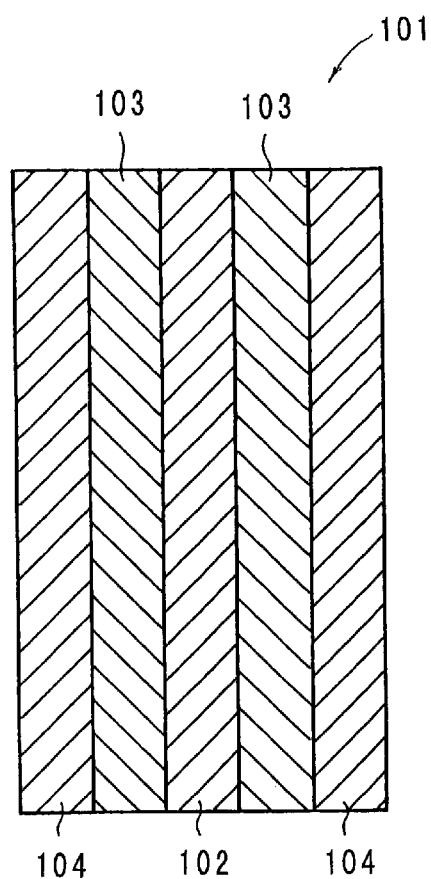
FIG. 10 is a cross-sectional view of FIG. 9 (B) viewed from I—I.

Thus, cross-sectional view of FIG. 9(B) indicated by arrows at I—I may appear as shown in FIG. 10. The sheets of polarizing electrodes 103 can be obtained by blending activated carbon, binders such as polytetrafluoroethylene, and conduction aids such as carbon black together, and rolling the product.

Another embodiment of electrode members is those obtained by coating the surfaces of collectors with a paste of a mixture of activated carbon, a binder, a conduction aid, and a solvent, drying to remove the solvent, and holding between separators (not illustrated).

Figure 11:
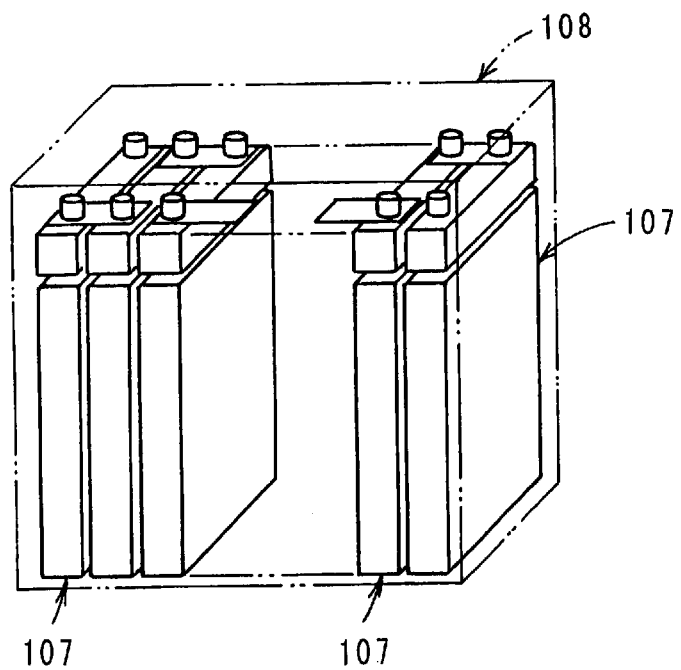
FIG. 11 is a perspective view illustrating a prepared state of an electrochemical capacitor module combining unit cells shown in FIG. 8.

The conventional flat capacitor 108 shown in FIG. 11 comprises plurality of these unit cells 107 connected in a series forming a module.

In comparison with such conventional capacitors 8, the present invention proposes an electrochemical capacitor using polarizing electrodes comprising as an essential ingredient carbon material containing partially oxidized graphite-like microcrystalline carbon. In the electrochemical capacitor of the present invention, capacitance is considered to be manifested by adsorption of ions to the electrochemical reaction products formed during the first charging, and the capacitance is shown to be 30 F/cc and the upper limited voltage 3.5 V, both properties being superior to those of conventional capacitors 108.

When such an electrochemical capacitor is charged by applying external voltage, the polarizing electrodes will expand to the direction of the electric field. This expansion is considered to be caused by the expansion of electrochemical reaction products formed during the first charging, reaching as much as twice the original volume in some cases.

Figure 12:
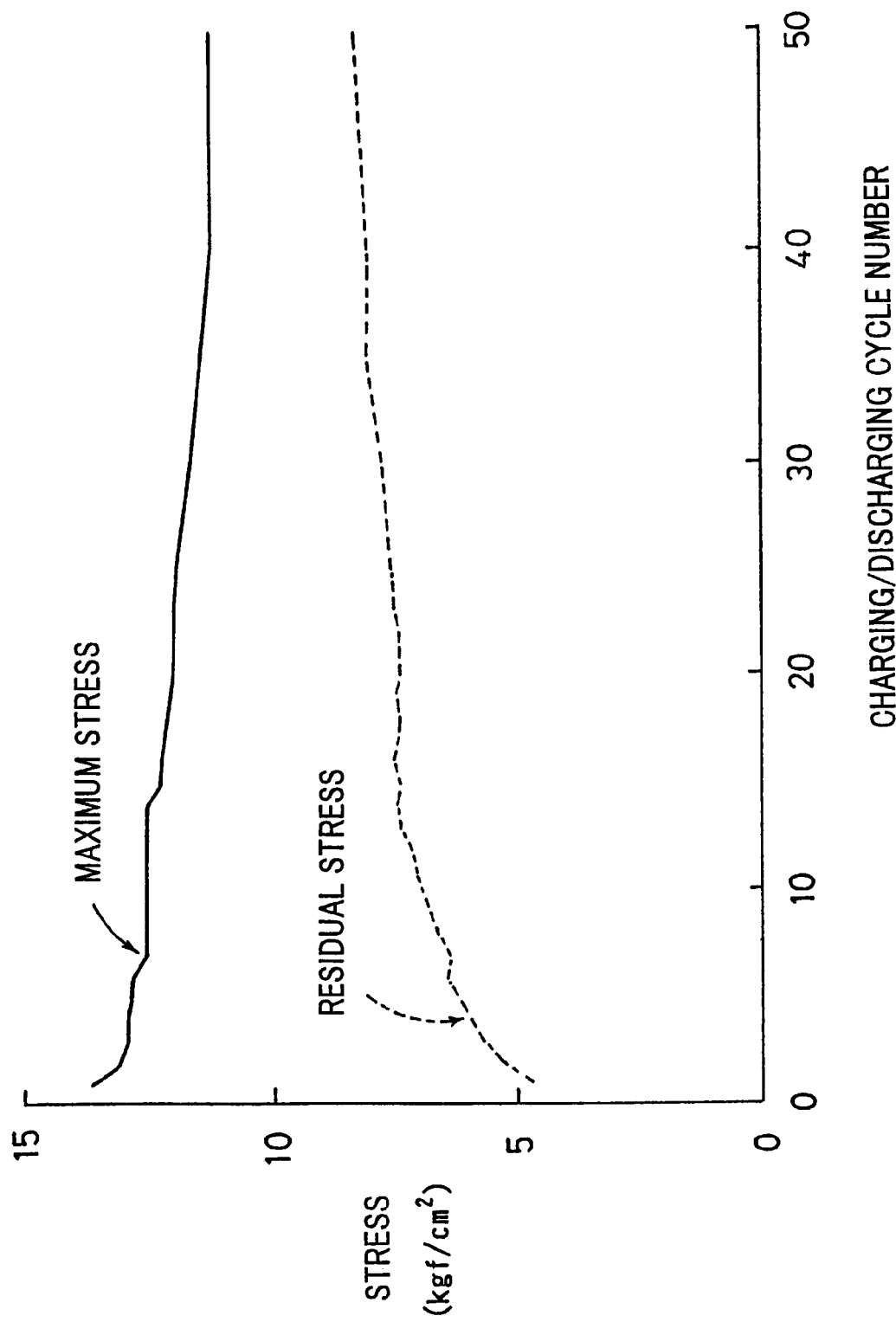
FIG. 12 is a graph showing the values of stress generated and remaining during charging and discharging cycles of an electrochemical capacitor of the present invention.

Such expansion of the polarizing electrodes during charging causes the expansion of electrode members and thus the stack. This will result in stress that eventually generates pressure against the container. FIG. 12 shows the maximum stress generated during each charging/discharging cycle (called the maximum stress value hereafter), and the stress value remaining at the end of charging (called the residual stress hereafter).

For the reasons described above, such inconveniences as plastic deformation of the cell containers have occurred in electrochemical capacitors of the construction mentioned above.

Therefore, the present inventors devoted themselves in finding the means to relax the stress caused by this expansion of polarizing electrodes and reached the present invention. Embodiments relating to the present invention will be precisely explained below in reference to FIGS. 1–7.

Embodiments corresponding to FIGS. 8–10 are given the symbols and explanation are omitted.

First, explanation of the electrochemical capacitor relating to the first embodiment (called the first capacitor hereafter) and the cell container the first capacitor is provided with will be given.

Figure 1:
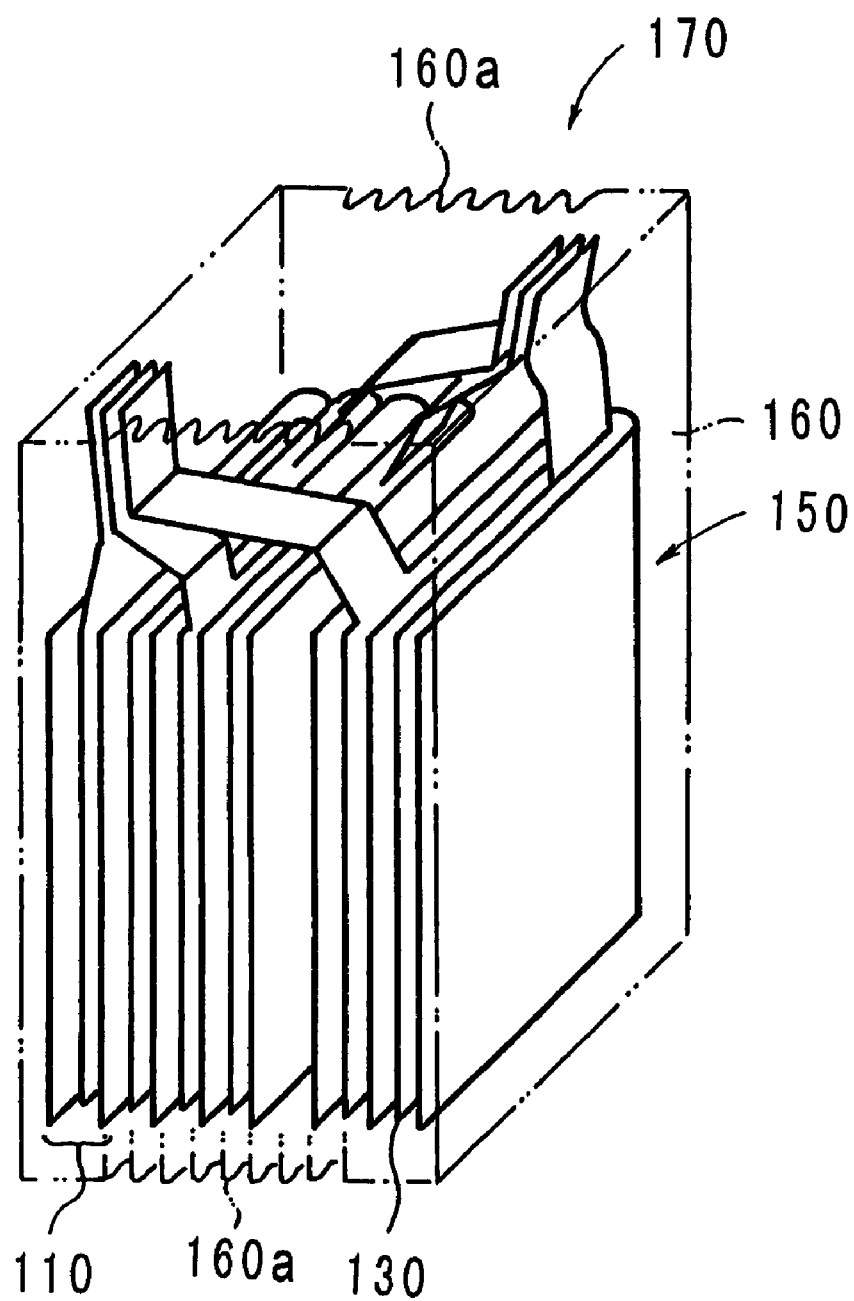
FIG. 1 is a perspective view illustrating an embodiment of the construction of an electrochemical capacitor (unit cell) relating to the present invention.
Figure 2:
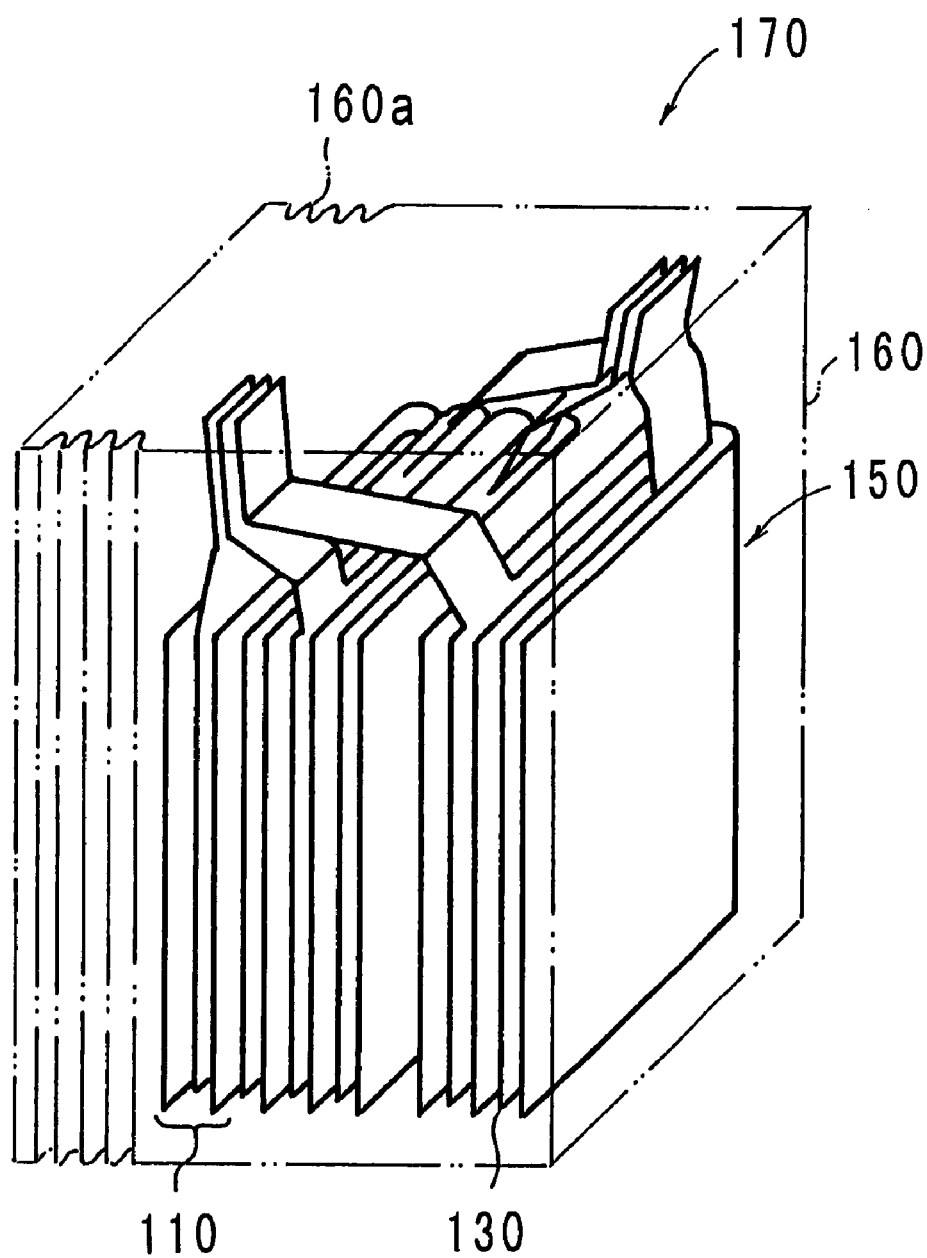
FIG. 2 is a perspective view illustrating another embodiment of the construction of an electrochemical capacitor (unit cell) relating to the present invention.

FIGS. 1 and 2 show the main parts of the unit cell 170 of the first capacitor.

The cell container 160 of this unit cell 170 is provided with a bellows 160a as a stress relaxation structure to relax the stress generated by the expansion of polarizing electrodes (carbon material). The cell container is preferably fabricated from stainless steel, for example.

The bellows 160a may be provided in the center of the cell container 160 as shown in FIG. 1, or at the end as shown in FIG. 2. It may also be provided to the entire cell container 160, though not illustrated. As the liquid level of the organic electrolytic solution is lowered when the bellows 160a is elongated, the length of the bellows 160a when completely elongated is determined so that the electrode members 110 may not be exposed out of the organic electrolytic solution.

The construction of the unit cell 170, etc. are based on the unit cell 170 described above, except that the carbon material having partially oxidized graphite-like microcrystalline carbon described above is used. And the capacitance of the unit cell 170 is considered to be manifested by adsorption of ions to the electrochemical reaction products during the first charging.

The electrode members 110 may be either based on the structure shown in FIGS. 8 and 9(B), or those obtained from carbon material, a binder such as polytetrafluoroethylene, and a conductance aid such as carbon black, applied onto the surfaces of collectors as a paste formed by mixing with a solvent, dried to remove the solvent by evaporation, and then held between separators 104.

The first capacitor is obtained by connecting a plurality of unit cells 170 with the construction described above in a series, and fabricating them as a nodule.

In this first capacitor, when the polarizing electrodes 130 expand during charging, namely when the whole stack 150 expands to generate stress, the bellows 160a is elongated. As the stress is relaxed by this elongation, deformation does not occur except for the cell container 160 and the bellows 160a.

And as polarizing electrodes 130 are still immersed in the organic electrolytic solution even when the bellows 160a is completely elongated, charging and discharging properties superior to conventional capacitors 108.

It is needless to say that the bellows 160a will not give fracture, and will not give fatigue fracture until the end of the charging/discharging cycle life of the first capacitor. Particularly, the bellows 160a will not fracture against the stress of 13.6 kgf/cm$^2$ (1.33 MPa), the highest value in FIG. 12, and is able to undergo over 100,000 elongation/contraction cycles.

Figure 3:
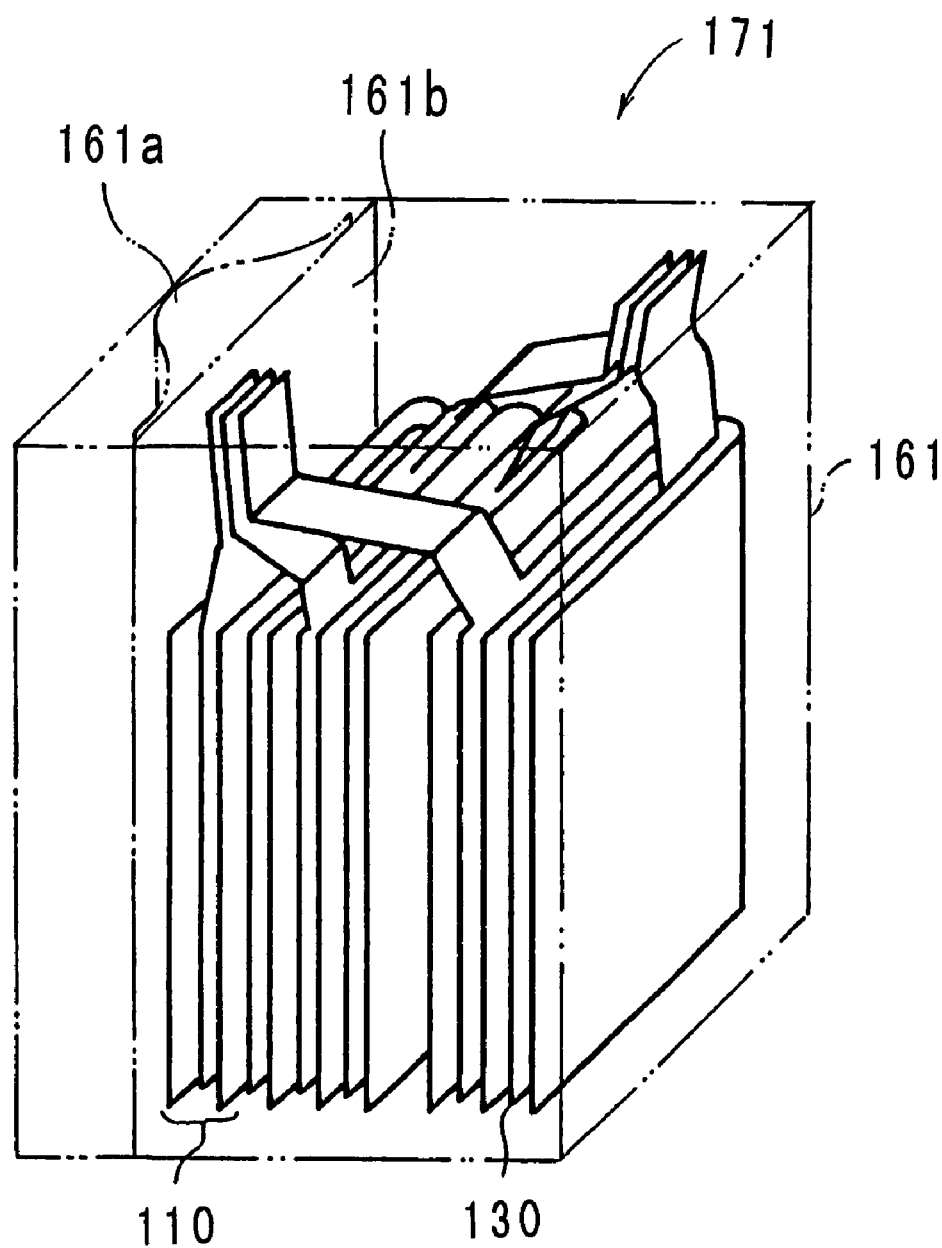
FIG. 3 is a perspective view illustrating still another embodiment of the construction of an electrochemical capacitor (unit cell) relating to the present invention.

Next, the electrochemical capacitor related to the second embodiment (called the second capacitor hereafter), and the cell container this second capacitor is provided with will be explained in reference FIG. 3 showing the main part of the unit cell 171.

The cell container 161, the second capacitor is provided with, is provided with a flat spring 161 a as a stress relaxing system.

The inside of this cell container 161 is divided into two rooms by a sliding plate 161b moving inside said cell container 161. Electrode members 110 are contained in one of the two rooms, and a flat spring 161a is set in another room. Also, the flat spring 161a may be fixed to the sliding plate 161b, or held between the sliding plate 161b and the external wall of the cell container 161.

When the polarizing electrodes 130 are expanded by charging, the sliding plate 161b moves to the left in FIG. 3, and the flat spring is contracted. Thus, the stress generated accompanying expansion of the polarizing electrodes 130 is relaxed.

Here, as shown in FIG. 12, the difference between the maximum stress value and the residual stress value converges on a constant value as the charging/discharging cycle advances. Therefore, the second capacitor may preferably be minimized by using a flat spring 161a with small spring modulus in the early stage when the difference is large, and changing springs to one with large spring modulus when the difference has converged on a constant value.

In the second capacitor the stress caused by expansion of the polarizing electrodes 130 can thus be relaxed without elongating the cell container 161 itself, and therefore there is an advantage that the cell container itself does not change its size.

Next, the electrochemical capacitor related to the third embodiment (called the third capacitor hereafter), and the electrode members this third capacitor is provided with will be explained in reference to FIG. 4.

Figure 4:
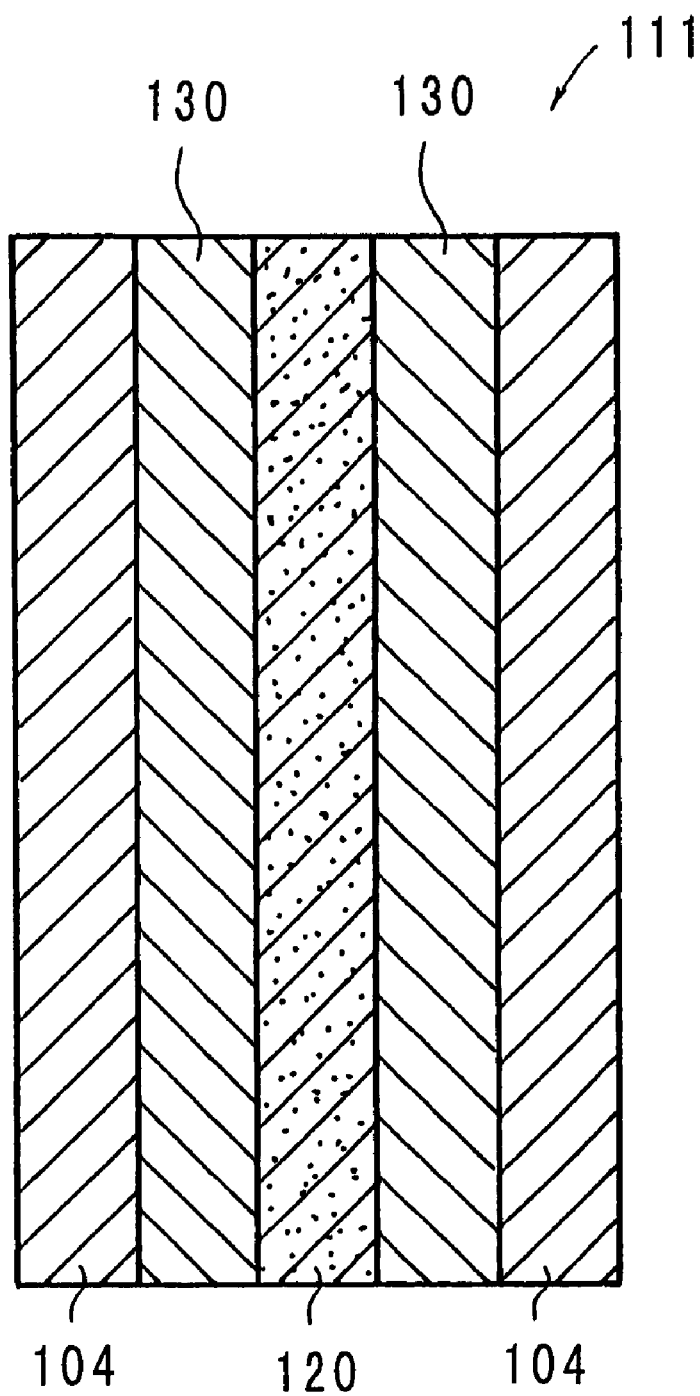

In the electrode members 111 the third capacitor is provided with, the collectors 120 are comprised of an elastic body as shown in the cross-sectional view in FIG. 4. Here, the cross-sectional view shown in FIG. 4 is seen from the same direction as in FIG. 10.

Thus, in this electrode member 111, the collector 120 comprising an elastic body is held between the polarizing electrode sheets 130 having carbon material as their active substance, and further held between separators 104. Here, the polarizing electrode sheets 130 are obtained by blending carbon material, a binder such as polytetrafluoroethylene, and a conduction aid such as carbon black, and then rolled.

As elastomers used as the collectors 120, those with collecting capability equal to the conventional collector material aluminum foil, etc. are used, and particularly porous conducting rubber sheet in which carbon black is dispersed or elastically deformable porous aluminum wool are preferable embodiments.

In the third capacitor having the same construction as the conventional capacitor 108 except for using elastomers described above as the collectors 120 and using polarizing electrodes 130, when the polarizing electrodes 130 expand to generate stress during charging, the collectors are pressurized, but as the collectors 120 are elastomers, strain easily occurs. Thus, as the stress due to expansion of the electrode members 130 is relaxed by the occurrence of the strain, expansion of the electrode members 111 as a whole is reduced. As a result, plastic deformation of the cell container can be prevented.

The collecting capability of the collectors 120 comprising elastomers described above equals that of the conventional collector material, aluminum foil, and therefore the third capacitor has charging/discharging properties superior to those of conventional capacitors 108.

Figure 5:
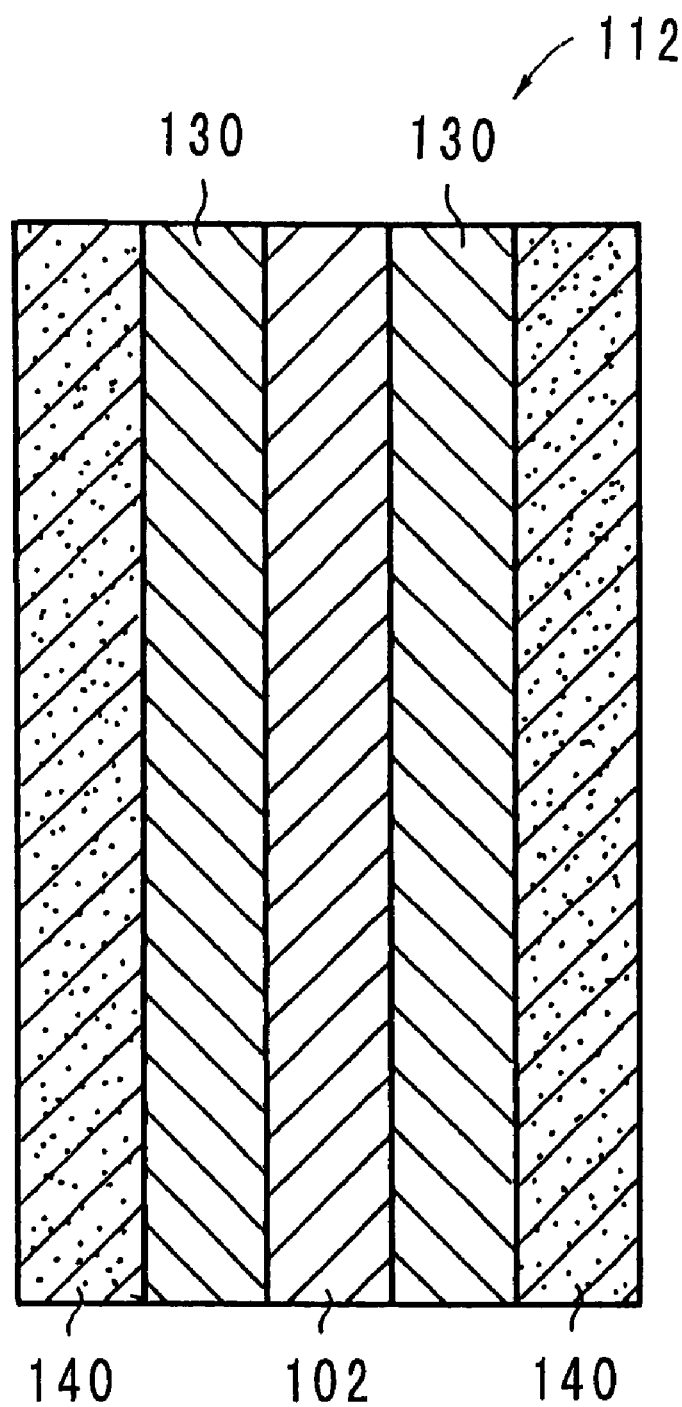

Next, the electrochemical capacitor elected to the fourth embodiment (called the fourth capacitor hereafter) and the electrode members this capacitor is provided with will be explained with reference to FIG. 5.

The electrode members 112 the fourth capacitor is provided with has separators 140 constructed from elastomers. Here the cross-section shown in FIG. 5 is seen from the same direction as in FIGS. 4 and 10.

Thus, these electrode members 112 are constructed by the collectors 102 held between the polarizing electrodes 130, and these being further held between separators 140 comprised of elastomers.

As elastomers used for the separators 140, insulating porous materials capable of electrically separating positive and negative poles and allowing electrolyte ions to penetrate through them are selected, insulating porous rubber, particularly porous fabric or nonwoven fabric of glass fiber, or cellulose nonwoven fabric being preferable.

Although in the fourth capacitor, having the same construction as conventional capacitors 108 except for using such an elastomer as described above as the separators 140 and using polarizing electrodes 130, polarizing electrodes 130 expand during charging to generate stress pressurizing the separators 140, the separators 140 easily strain because they are elastomers. Thus, the stress due to expansion of the polarizing electrodes 130 is relaxed by strain formation, suppressing expansion of the electrode members 112 as a whole. This results in prevention of plastic deformation of the cell container.

And the elastomers described above have ion penetrating capacity equal to that of a blend paper, and therefore the fourth capacitor has charging/discharging properties equal to those of the third capacitor.

The electrode members of the present embodiment may be those obtained from carbon material, a binder, and a conductance aid applied onto the surfaces of collectors of aluminum foil, etc. as a paste formed by mixing with a solvent, drying to remove the solvent by evaporation, and then holding between separators 140 comprising of elastomers described above.

Next, the electrochemical capacitor related to the fifth embodiment (called the fifth capacitor) and the electrode members the fifth capacitor is provided with will be explained with reference to FIG. 6.

The electrode members 113 the fifth capacitor is provided with has collectors 120 and separators 140 comprised of elastomers. The cross-sectional view shown in FIG. 6 is seen from the same direction as in FIGS. 4, 5, and 10.

Thus, these electrode members 113 are constructed by the collectors 120 held between the polarizing electrodes 130, and these being further held between separators 140 comprised of elastomers.

In the fifth capacitor, having the same construction as conventional capacitors 108 except for being provided with such collectors 120 and separators 140, and using polarizing electrodes 130, the stress generated accompanying expansion of the polarizing electrodes 130 is relaxed by formation of strain both in the collectors 120 and in the separators 140. Thus, the fifth capacitor has charging/discharging properties equal to those of conventional capacitors 108, is superior to the third and fourth capacitors in the stress relaxing effects. Therefore it is suitable to the cases when greater stress is generated, for example in case a greater number of electrode members are stacked.

The electrode members of the present embodiment may be those obtained from carbon material, a binder, and a conductance aid applied onto the surfaces of collectors 120 as a paste formed by mixing with a solvent, drying to remove the solvent by evaporation, and then holding between separators 140.

Further, the electrochemical capacitor related to the present invention may be provided at the same time with the cell container and one of the three electrode members described above. As an embodiment, the electrochemical capacitor related to the sixth embodiment (called the sixth capacitor hereafter) will be explained with reference to FIG. 6.

Figure 6:
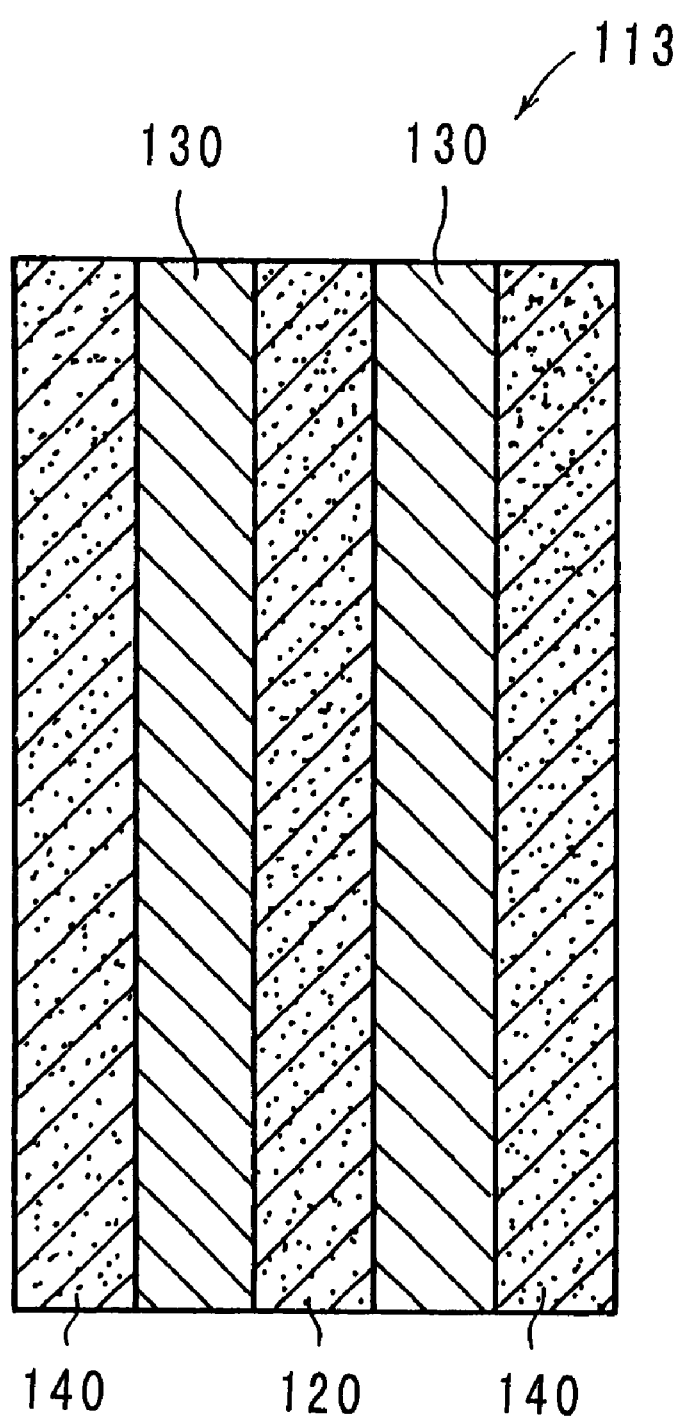
Figure 7:
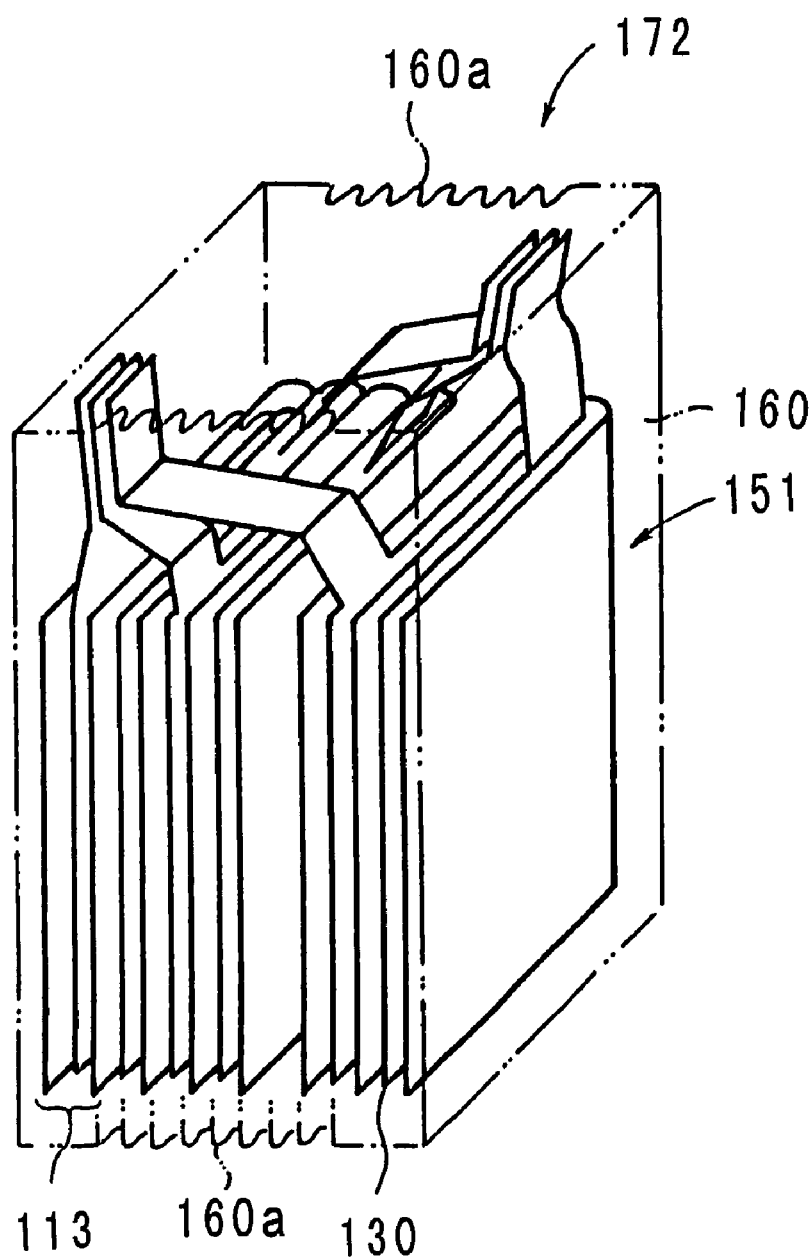
FIG. 7 is a perspective view illustrating still another embodiment of the construction of an electrochemical capacitor (unit cell) relating to the present invention.

The unit cells 172 of the sixth capacitor have the same construction as that of the unit cells 107 of conventional capacitors 108, except for setting the stack 151 stacking the electrode members 113 shown in FIG. 6 in the cell container 160, as shown in FIG. 7. The sixth capacitor is obtained by stacking a plurality of these unit cells 172 to fabricate a module.

In this sixth capacitor both the electrode members 113 and the cell container 160 can relax the stress. Thus, it is superior to the first and fifth capacitors in the stress relaxing effect. Therefore, the cell container 160 is free from plastic deformation, etc., and better charging/discharging property is obtainable than conventional capacitors 108.

In each of the first through sixth capacitors, it is desirable to pressurize the electrode members by applying pressure in the direction of stacking of the stacks. This is because the contact resistance between the collectors and the polarizing electrodes is reduced. Application of pressure may be realized, for example, by compressing the stack with suitable pressure in advance and putting them in a cell container whose volume is just enough to keep the compressed state. In this case, the pressure is preferably 2 kgf/cm$^2$ (196 kPa) or above. Therefore, when the flat spring is changed in the second capacitor as described above, it is preferable that spring modulus of the flat spring is enough to apply pressure of 2 kgf/cm$^2$ (196 kPa) or above to the stack.

Also, in each of the first through sixth capacitors, the polarizing electrodes and the separators located between the positive and negative poles may be impregnated with the organic electrolytic solution. Even such capacitors show capacitance and upper limited voltage equal to those of capacitors having stacks completely immersed in the organic electrolytic solution. In the present invention, the state of polarizing electrodes being immersed in organic electrolytic solution shall include such a state of polarizing electrodes and separators being impregnated with organic electrolytic solution.

Next, an electrochemical capacitor related to still another aspect of the present invention will be explained.

When charging/discharging cycles are carried out on a electrochemical capacitor utilizing polarizing electrodes such as described above, the organic electrolytic solution with which separators are impregnated together with the electrolyte ions is also adsorbed to the carbon material during charging. This phenomenon is especially significant during the first charging, but also occurs during later charging. Therefore, when conventional cellulose blend paper is used as the separator, the organic electrolytic solution will decrease as charging advances, and in some cases all the solution will be absorbed to cause so called drying-up, resulting in the inconvenience that charging of electrochemical capacitors becomes impossible.

Also, this has resulted in the problem that internal resistance becomes very large at the beginning of charging, though charging/discharging is possible as the absorbed organic electrolytic solution is released from the carbon material on charging. Further, in cases where cellulose blend paper is used for separators in the same manner as in conventional capacitors, as cellulose blend paper is thin and not strong enough, when the carbon material expands during charging by intake of the electrolyte ions and absorption of the organic electrolytic solution, polarizing pole layers tend to go through the separators, resulting in the inconvenience of occasional occurrence of short circuit between the positive and negative poles.

Therefore, the present inventors devoted themselves in dissolving shortage of organic electrolytic solution due to repeated charging and preventing short circuit between the positive and negative poles and completed the present invention. Thus, sponge-like porous insulators are used as separators in the electrochemical capacitors of the present invention. That is because sponge-like porous insulators can retain a lot of liquid inside. Also, that is because polarizing electrode layers will not go through separators. Further, that is because porous materials will not prevent ions from going through.

Preferable embodiments of the electrochemical capacitor of the present invention will be precisely explained below with reference to FIG. 19. Matters corresponding to FIG. 18 are given same symbols, and precise explanation is omitted.

Figure 19:
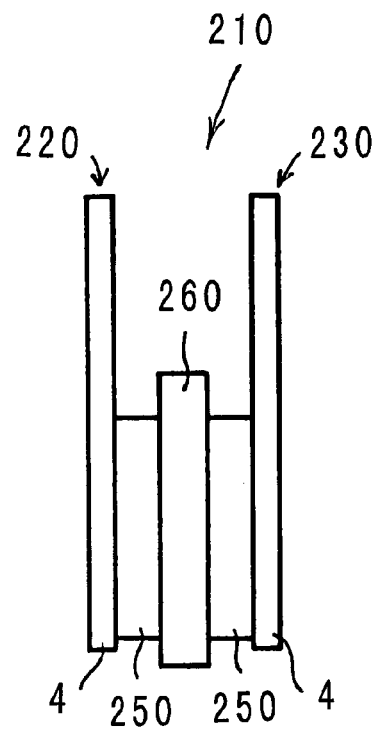

The pair of electrodes 210 of the electrochemical capacitor of the present invention is constructed by combining a positive pole 220 and a negative pole 230 each fabricated by forming layers of polarizing electrodes 250 having as main components carbon material with partially oxidized graphite-like microcrystalline carbon on the collectors 4, as shown in FIG. 19.

Layers of polarizing electrodes 250 are formed, for example, mixing and blending carbon material, a binder and a conduction aid to form a sheet, processing it into a fixed form and area, and attaching it to the collectors 4. Also they may be formed by coating the surface of the collectors 4 with a paste prepared by mixing carbon material, a binder and a conduction aid with a solvent, and drying them to remove the solvent by evaporation.

Also, separators 260 comprised of sponge-like porous insulators are located between the positive poles 220 and the negative poles 230. "Sponge-like" indicates here the property of materials capable of absorbing and holding large amounts of liquid in which the material is immersed, and capable of elastic deformation.

As the separators 260 are sponge-like, they may be impregnated with large amounts of organic electrolytic solutions such as ethylene carbonate, propylene carbonate, γ-butyrolactone, sulfolane, etc. in which electrolytes such as Et$_4$NBF$_4$ (Et$_4$N; tetraethylamnonium), Et$_4$NPF$_6$, Bu$_4$NBF$_4$ (Bu$_4$N: tetrabutylammonium) or Bu$_4$NPF$_6$ are dissolved at a fixed concentration, for example, of 1 mol/l. Therefore, the inconvenience of shortage of organic electrolytic solutions will not occur during operation of the electrochemical capacitors, as described below. Needless to say, separators 260 must be impregnated with more organic electrolytic solutions than is absorbed by the carbon material.

Further, separators 260 are highly elastic as they are sponge-like. Thus, they will easily deform themselves in case layers of polarizing electrodes 250 expand. Therefore, the layers of polarizing electrodes 250 will not go through separators 260.

As separators 260, materials that are sponge-like, porous insulators so that electrolyte ions can go through, and electrochemically inert are selected. Particularly, glass fiber nonwoven fabric, and polymeric materials such as nylon are suitable. Fibers made of organic compounds may be used as a part of glass fiber nonwoven fabrics.

When an electrochemical capacitor having pairs of electrodes 210 is charged, capacitance is considered to appear on the electrochemical capacitor, as ions are absorbed to the electrochemical reaction products formed during the first charging.

During charging, the organic electrolytic solution with which the separators located between the positive poles 220 and the negative poles 230 are impregnated is absorbed into the carbon material. As the separators 260 are impregnated with a large amount of organic electrolytic solution, however, shortage of the organic electrolytic solution will not occur during operation of the electrochemical capacitor. Also, though the layers of polarizing electrodes 250 expand due to intake of the electrolyte ions by the carbon materials and absorption of the organic electrolytic solution by the carbon material during charging, the polarizing electrodes 250 will not go through the separators 260, and short circuit between the positive poles 220 and the negative poles 230 will not occur, as the sponge-like separators 260 easily deform themselves. Further, as the separators 260 are porous insulators that can electrically insulate the positive poles 220 and the negative poles 230 while allowing the electrolyte ions to go through, they will not interfere with the charging/discharging reaction of the electrochemical capacitor.

The separators 260 are preferably provided with parts comprised of rigid materials, in order to prevent leakage of electrolytic solution from the separators 260 in case the pairs of electrodes 210 are compressed by applying pressure in order to reduce the contact resistance between the collectors 4 and the polarizing electrodes 250.

Figure 20:
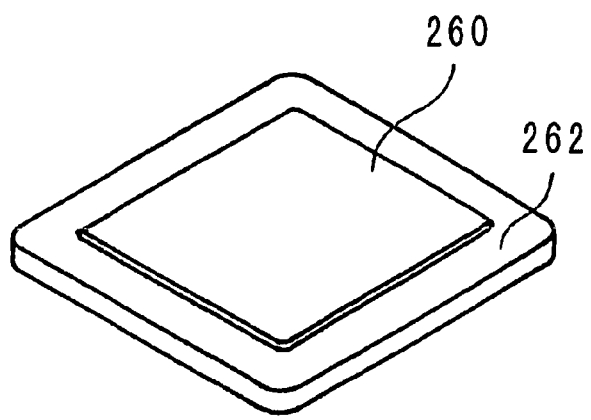
FIG. 20 is a perspective view showing the state wherein a frame surrounding the outer edges of a separator is provided.

Particularly, the separators 260 may be provided with frames 262 made of rigid material around their outer edges, as shown in FIG. 20. By providing these frames 262, the separators 260 will not be compressed below the thickness of the frames 262 when pressurized. Therefore, the electrolytic solution the separators 260 are impregnated with may not leak.

Figure 21:
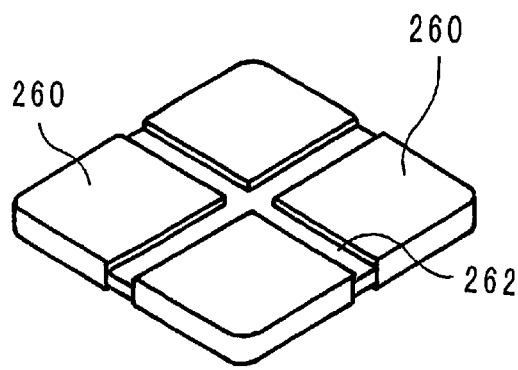
FIG. 21 is a perspective view showing the state wherein a separator is provided with cross-shaped frames.
Figure 22:
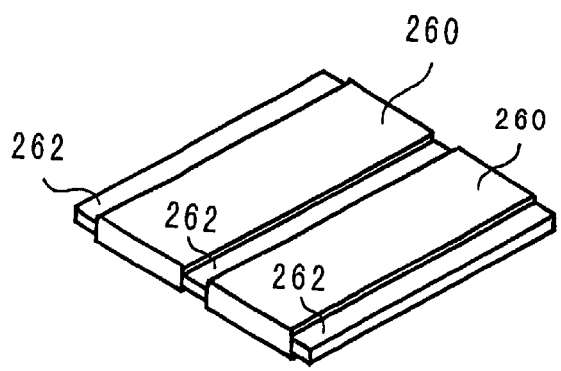
FIG. 22 is a perspective view showing the state wherein a separator is provided with frames at both edges and in the center.

The frames 262 are not limited to those surrounding the outer edges of the separators 260 as shown in FIG. 20, and may be provided for example in the form of crosses as shown in FIG. 21 or in both edges and in the center of the separators 260 as shown in FIG. 22.

Preferable examples of the materials for frames 262 are porous insulators of ceramics, plastics, etc. It is because internal resistance will not rise as those materials will not prevent migration of electrolyte ions.

Also, the frames 262 may be formed by hardening parts of the separators 260.

Figure 23:
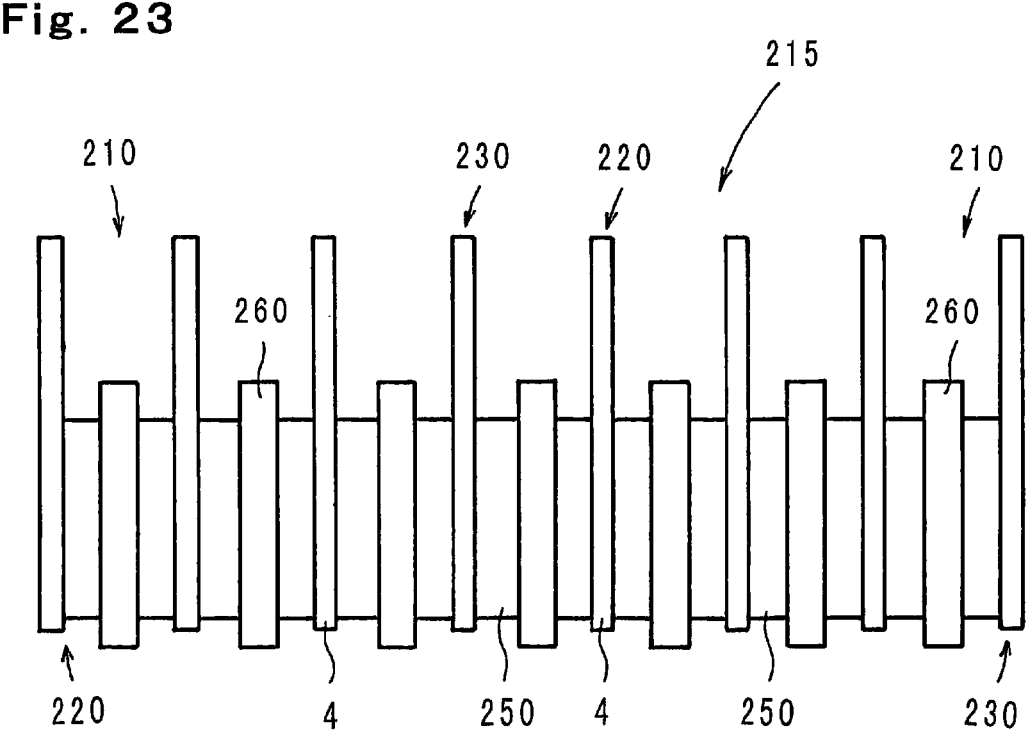
FIG. 23 illustrates an embodiment of a stack construction wherein electrode pairs with which the electrochemical capacitor of the present invention is provided are stacked.

While a pair of electrodes is shown in the embodiment described above, a stack 215 wherein plural pairs of electrodes 210 are stacked as shown in FIG. 23 may be used. In this case, layers of polarizing electrodes 250 may be formed on both side of collectors 4, and separators 260 may also be located between the pairs of electrodes 210.

Although embodiments of the present invention will be explained below, needless to say, these embodiments shall not limit the present invention.

Embodiments 1, 2 and Comparative Example 1

Petroleum coke (100 g), used as the organic material, was carbonized by heat treatment in an atmosphere of nitrogen at 800° C. for 2 hours, and cooled to the room temperature. The rate of heating was 100° C./h. The carbon material obtained was then ground to mean particle size of 35 µm. This carbon material powder (50 g) and potassium hydroxide (100 g) were placed in an alumina crucible and alkaline activation treatment was carried out in an atmosphere of nitrogen at 800° C. for 2 hours. After cooling, unnecessary potassium compounds such as potassium hydroxide were removed by water cleaning, and powdery carbon material was obtained by filtration and drying.

Carbon black (0.1 g) as the conduction aid and PTFE (polytetrafluoroethylene) as the binder were added for 1 g of the carbon material obtained, mixed, blended, and further rolled to form a 0.5 mm thick sheet. Disc with 19 mm φ punched out of the electrode sheet thus obtained were used as the polarizing electrodes of the positive and negative poles, aluminum foil was used as the collectors, glass fiber nonwoven fabric was used as the separators, PC was used as the solvent, and methlethylpyrolidinium tetrafluoroborate (MEPYBF4) was used as the electrolyte to prepare electrolytic solution of concentration of 2 mol/l, to fabricate a capacitor (Embodiment 1) having structure equal to the single electrode cell 10 described in FIG. 15. As a case, one made of resin film was used in order to determine the surface pressure difference described below.

PC was used as the solvent and trimethylethylammonium tetrafluoroborate (TEMABF4) was used as the electrolyte to prepare an electrolytic solution of concentration of 2 mol/l, to fabricate a capacitor (Embodiment 2) having structure equal to that of the single electrode cell 10 shown in FIG. 15.

Further, as a comparative example, PC was used as the solvent and tetraethylammonium tetrafluoroborate (TEABF4) was used as the electrolyte to prepare an electrolytic solution of concentration of 1 mol/l, to fabricate a capacitor (Embodiment 2) having structure equal to that of the single electrode cell 10 shown in FIG. 15.

The three kinds of capacitors described above were charged up to 4 V at an initial current of 5 mA, and activated by constant voltage charging for 20 min, then a charging/discharging test was carried out at 2 V, 2.5 V, 3 V, 3.5 V, and 4 V. The charging current was 10 mA and the discharging current was 5 mA for the test.

Figure 24:
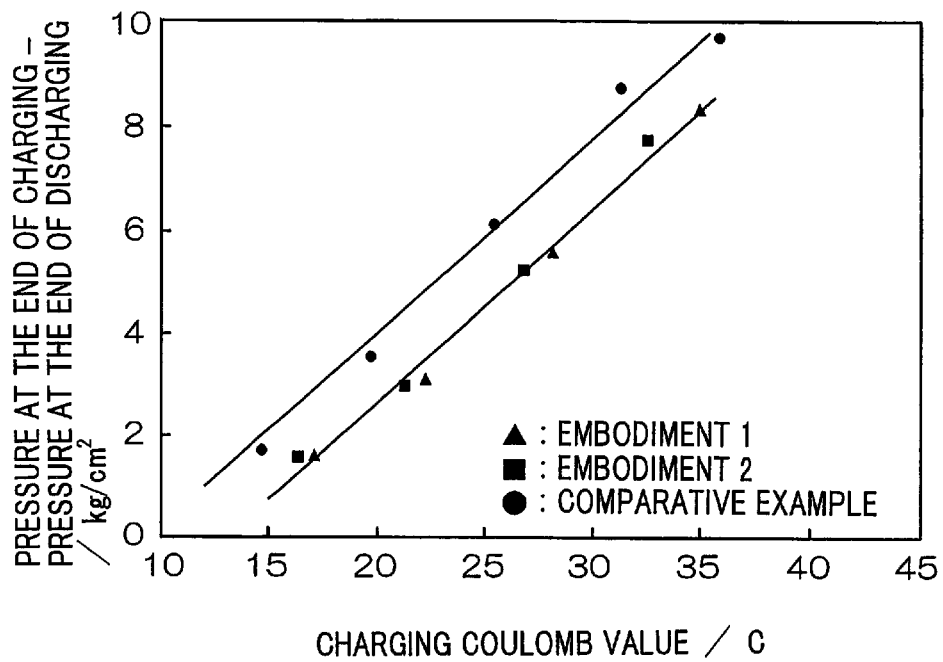
FIG. 24 is a graph showing relation between the surface pressure generated on electrochemical capacitors and the discharge coulomb value of an embodiment and a comparative example.

FIG. 24 is a graph showing the relation between discharging coulomb quantity and pressure difference (surface pressure difference) of the end of charging and the end of discharging. As shown in FIG. 24, the surface pressure difference was confirmed to be smaller with embodiments 1 and 2 than with the comparative example. Here, surface pressure difference was determined using a determination apparatus 51 having a pressure sensor 53 such as a strain gauge located on the base 52, the lower mold 54 located on the pressure sensor 53, and the upper mold 57 capable positioning and fixing with a screw 59, holding the various capacitors prepared 56 (using resin film as the case) between the lower mold 54 and the upper mold 57, and following the pressure difference accompanying charging/discharging of capacitors 56 by reading the indication of the pressure sensor 53. The lower mold 54 and the upper mold 57 are freely movable perpendicularly by way of a linear bush 55.

Figure 25:
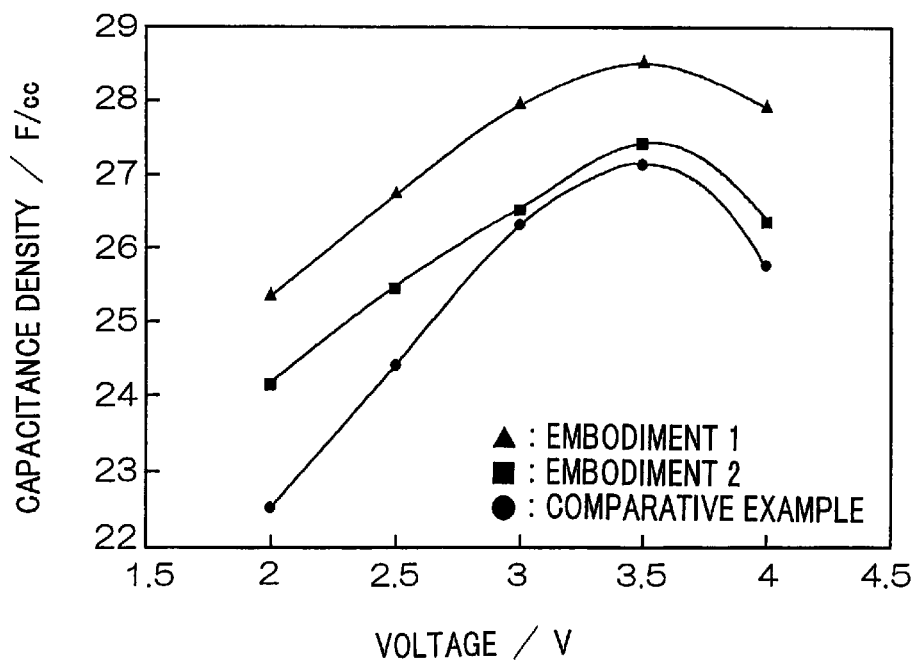
FIG. 25 is a graph showing relation between the capacitance volume density applied to electrochemical capacitors and the voltage of an embodiment and a comparative example.
Figure 26:
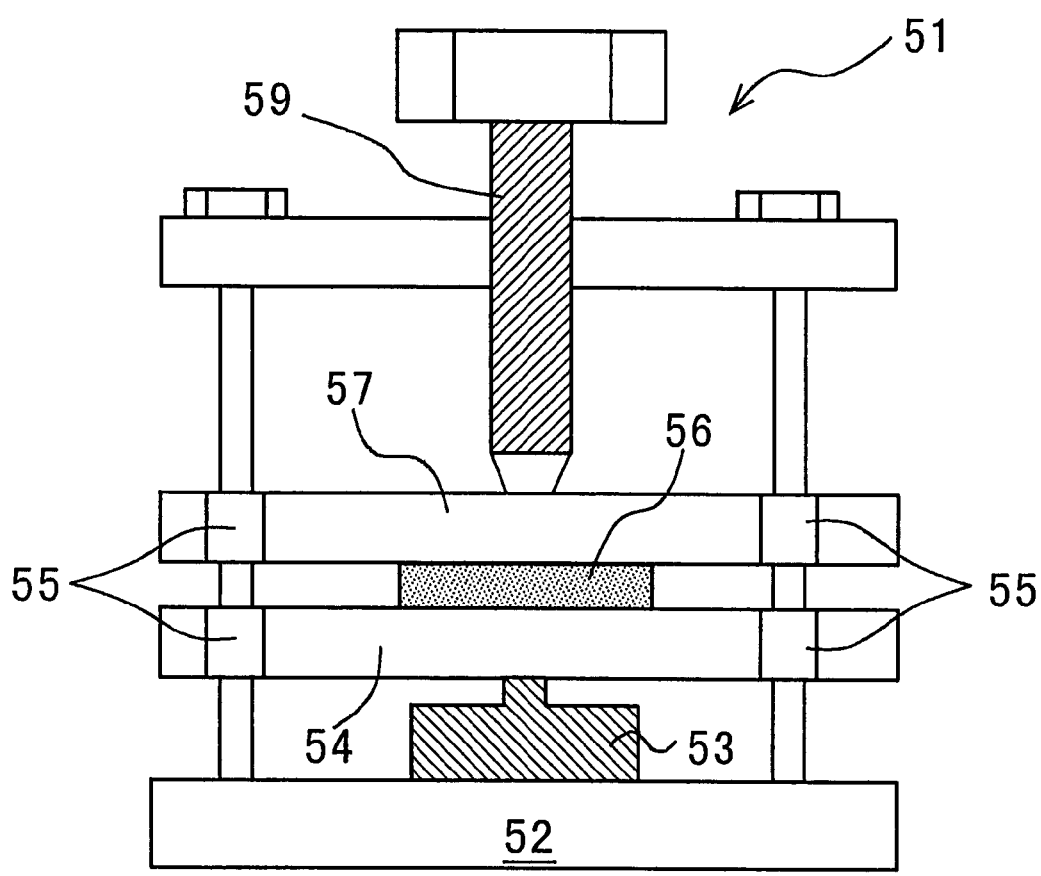
FIG. 26 is a schematic cross-sectional view of the structure of an apparatus for determining surface pressure generated by volume expansion of the electrochemical capacitor.

Next, FIG. 25 is a graph showing the relation between the capacitance density of embodiments 1, 2 and the comparative example and voltage. The case material and the shape of the case are not considered, and therefore this capacitance density indicates capacitance density of single electrode cells only. As shown in FIG. 25, improvement of capacitance density of single electrode cells was confirmed to be realized.

Embodiment 3 and Comparative Example 2

Petroleum coke was heat treated in an atmosphere of nitrogen at 800° C. for 2 hours to obtain a carbonized substance. After grinding to mean particle size of 40 µm, the carbonized substance was mixed with KOH in the ratio of 1:2 (by weight, same hereafter). This mixture was heat treated in an atmosphere of nitrogen at 800° C. for 2 hours, and then washed with water and dried to obtain a carbon material with graphite-like microcrystalline carbon.

Then, the obtained carbon material, acetylene black (conduction aid), and polytetrafluoroethylene (binder) are mixed in the ratio of 10:1:1, and blended to give a sheet of thickness of 0.5 mm thickness. Discs with diameter of 19 mm punched out from the sheet were used as polarizing electrodes 250.

Then, the positive pole 220 and the negative pole 230 were prepared by attaching said polarizing electrode 250 to the collectors 4 comprised of aluminum, and they were combined to prepare a pair of electrodes 210.

Then, a separator 260 made of borosilicate glass fiber with 440 µm thickness and 0.25 g/cm$^3$ density, impregnated in advance with 2 cc organic electrolytic solution of 1 mol/l of Et$_4$NBF$_4$ dissolved in propylene carbonate was located between the positive pole 220 and the negative pole 230, as shown in FIG. 19. Further, the amount of liquid retention per unit area of this separator 260 was 0.58 cc/cm$^2$.

And an electrochemical capacitor having them was then fabricated. This electrochemical capacitor will be called Embodiment 3 hereafter.

Also, for comparison, an electrochemical capacitor with construction based on embodiment 3, except for using as the separator cellulose blend paper of 35 µm thickness and 0.41 g/cm$^3$ density with amount of liquid retention per unit area of 0.03 cc/cm$^2$, was fabricated. This electrochemical capacitor will be called the comparative example 2.

Figure 27:
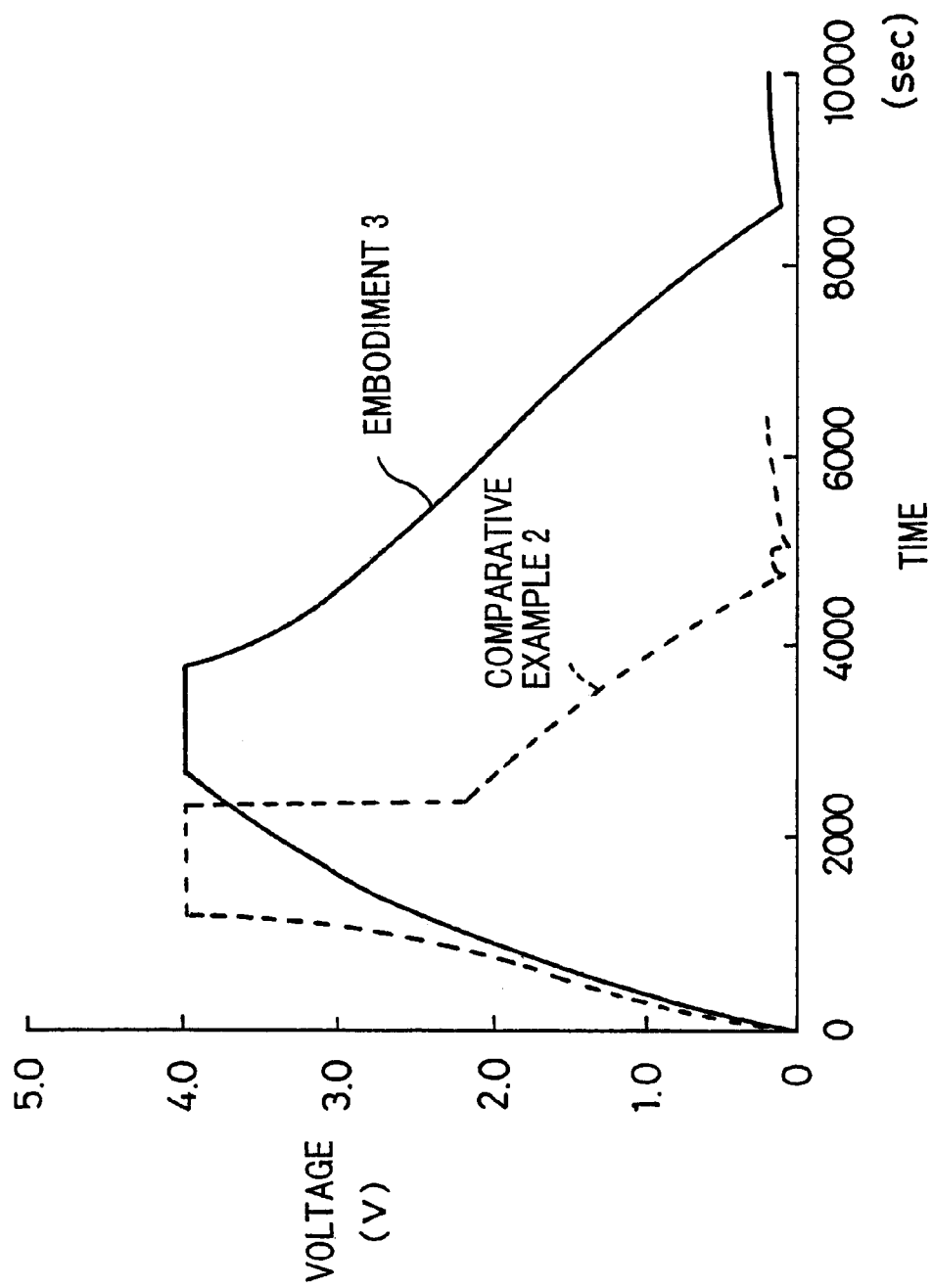
FIG. 27 is a graph showing the third cycle charging and discharging voltage curves of an embodiment 3 and comparative example 2.

Charging/discharging cycle was carried out on the embodiment 3 and the comparative example 2. Particularly, a cycle of constant current charging at 10 mA (up to 4 V) and constant current discharging at 5 mA was repeated. The third cycle charging/discharging voltage curves of the embodiment 3 and the comparative example 2 are shown in FIG. 27. In FIG. 27 the solid line represents embodiment 3 and the dotted line represents the comparative example 2. From FIG. 27 it is understood that the voltage rapidly rose during charging stopping charging in the comparative example, and charging continued at that stage in the embodiment 3.

Observation of the disassembled comparative example 2 after charging showed significant expansion of the polarizing electrode layer. The expanded layer did not go through the separator, but pressed deep into it just before shortage between the positive and negative poles. And the organic electrolytic solution the separator was impregnated with was almost absorbed by the polarizing electrode, causing "drying up."

On the other hand, similar observation of the disassembled embodiment 3 after charging showed that the layer of polarizing electrodes 250 expanded but did not go through the separator 260. And enough of the organic electrolytic solution remained in the separator 260. Moreover, capacitance of 30 F/cc and upper limited voltage of 3.5 V were obtained, both surpassing the values of conventional values. From the above results, the electrochemical capacitor of the present invention was confirmed to have properties superior to those of a conventional capacitor and longer life than the comparative example.

According to the present invention as described above, as volume change accompanying charging/discharging of polarizing electrodes and the pressure due to the volume change may be reduced, significant effects are obtained including increase in freedom of selection of material for cases and designing the case thickness, increase in capacitance density and weight density of capacitance, and improvement of reliability and lengthening of life. Also, the present invention has the effect of increasing capacitance of the single electrode itself excluding the case.

Further, according to the present invention, it is possible to provide electrochemical capacitors showing capacitance and upper limited voltage that surpass those of electric double layer capacitors utilizing conventional activated carbon materials.

What is claimed is:

1. An electrochemical capacitor comprising:

electrode members comprising polarizing electrodes, each said polarizing electrode comprising a carbon material having partially oxidized graphite-like microcrystalline carbon, separators, and collectors, an organic electrolytic solution, and a cell container containing the electrode members and the organic electrolytic solution, said electrode members being immersed in the organic electrolytic solution, and said polarizing electrodes expanding on charging and contracting on discharging, wherein said electrode members and said cell container are provided with stress relaxing structure.

2. The electrochemical capacitor according to claim 1, wherein said stress relaxing structure is a bellows.

3. The electrochemical capacitor according to claim 1, wherein said stress relaxing structure is a flat spring.

4. The electrochemical capacitor according to claim 1, wherein at least either said collectors or said separators comprise an elastomer.

5. An electrochemical capacitor of claim 4, wherein said collectors are porous conducting rubber sheet capable of elastic deformation.

6. The electrochemical capacitor according to claim 4, wherein said collectors are porous aluminum sheets capable of elastic deformation.

7. An electrochemical capacitor of claim 4, wherein said separators are insulating porous bodies capable of elastic deformation.

8. The electrochemical capacitor according to claim 7, wherein said insulating porous bodies are at least one selected from the group consisting of porous rubber, porous glass fiber fabric, and cellulose nonwoven fabric.

9. The electrochemical capacitor to claim 1, wherein said electrode members are pressurized with pressure of 2 kgf/cm$^2$(196 kPa) or more.

10. An electrochemical capacitor comprising:

electrode members comprising polarizing electrodes, each said polarizing electrode comprising a carbon material having partially oxidized graphite-like microcrystalline carbon, separators, and collectors, and an organic electrolytic solution, said electrode members being immersed in the organic electrolytic solution, and said polarizing electrodes expanding on charging and contracting on discharging, wherein at least either said collectors or said separators comprise an elastomer.

11. An electrochemical capacitor of claim 10, wherein said collectors are porous conducting rubber sheets capable of elastic deformation.

12. The electrochemical capacitor according to claim 10, wherein said collectors are porous aluminum sheets capable of elastic deformation.

13. An electrochemical capacitor of claim 10, wherein said separators are insulating porous bodies capable of elastic deformation.

14. The electrochemical capacitor according to claim 13, wherein said insulating porous bodies are at least one selected from the group consisting of porous rubber, porous glass fiber fabric, and cellulose nonwoven fabric.

15. The electrochemical capacitor according to claim 10, wherein said electrode members are pressurized with pressure of 2 $kgf/cm^2$ (196 kPa) or more.

* * * * *